(12) United States Patent
Tani

(10) Patent No.: US 11,166,537 B2
(45) Date of Patent: Nov. 9, 2021

(54) COATING MATERIAL FEEDING CONTAINER

(71) Applicant: TOKIWA CORPORATION, Nakatsugawa (JP)

(72) Inventor: Yoshikazu Tani, Kawaguchi (JP)

(*) Notice: Subject to any disclaimer, the term of this patent is extended or adjusted under 35 U.S.C. 154(b) by 0 days.

(21) Appl. No.: 16/868,537

(22) Filed: May 7, 2020

(65) Prior Publication Data
US 2020/0260837 A1 Aug. 20, 2020

Related U.S. Application Data

(63) Continuation of application No. 16/108,061, filed on Aug. 21, 2018, now Pat. No. 10,681,972.

(30) Foreign Application Priority Data

Aug. 23, 2017 (JP) .............................. JP2017-160515

(51) Int. Cl.
*A45D 40/20* (2006.01)

(52) U.S. Cl.
CPC ........... *A45D 40/205* (2013.01); *A45D 40/20* (2013.01); *A45D 2040/208* (2013.01)

(58) Field of Classification Search
CPC ............... A45D 40/205; A45D 40/20; A45D 2040/208; A45D 40/00; A45D 40/0081; A45D 40/0087; A45D 40/02; A45D 40/04; A45D 40/06; A45D 2040/20; A45D 2040/207; A45D 2040/205; A45D 2040/025

USPC ....................................... 401/86, 87, 9, 6, 11
See application file for complete search history.

(56) References Cited

U.S. PATENT DOCUMENTS

| 4,983,059 | A | 1/1991 | Holloway |
| 5,131,773 | A | 7/1992 | Gueret |
| 5,954,441 | A | 9/1999 | Welschoff |
| 7,883,287 | B2* | 2/2011 | Thorpe ................. A45D 34/04 401/266 |
| 8,231,294 | B2 | 7/2012 | Grossnass et al. |
| 8,313,262 | B2 | 11/2012 | Delbove |
| 8,328,447 | B2 | 12/2012 | Tani |
| 9,578,949 | B2* | 2/2017 | Villarreal .............. A45D 34/04 |

(Continued)

FOREIGN PATENT DOCUMENTS

| CN | 2740037 | 11/2005 |
| CN | 1946615 | 4/2007 |

(Continued)

*Primary Examiner* — David J Walczak
(74) *Attorney, Agent, or Firm* — Soei Patent & Law Firm

(57) ABSTRACT

A coating material feeding container or applicator includes a coating material that extends in an axial direction, and a container body that has a feeding mechanism for feeding the coating material in the axial direction. The container body includes a distal tube for holding the coating material. A front end portion of the distal tube has a distal tube tilt surface extending in a direction tilting to the axial direction. A shape of the coating material when viewed from a front side is a shape spreading in a major axis direction and a minor axis direction. The coating material has a distal end having an acute angle shape extending along the major axis direction, and a coating material tilt surface extending from the distal end in a direction tilting to the axial direction and tilting to the minor axis direction.

7 Claims, 24 Drawing Sheets

(56) References Cited

U.S. PATENT DOCUMENTS

| | | |
|---|---|---|
| 2002/0015611 A1 | 2/2002 | Blondeel et al. |
| 2007/0003359 A1 | 1/2007 | Tani |
| 2008/0016706 A1 | 1/2008 | Sasaki |
| 2008/0019760 A1 | 1/2008 | Sasaki |
| 2012/0076568 A1 | 3/2012 | Tani |
| 2014/0064822 A1 | 3/2014 | Tani |

FOREIGN PATENT DOCUMENTS

| | | |
|---|---|---|
| CN | 101108042 | 1/2008 |
| CN | 101108043 | 1/2008 |
| CN | 103653685 | 3/2014 |
| CN | 106793859 | 5/2017 |
| EP | 0382591 | 8/1990 |
| EP | 1133937 | 9/2001 |
| JP | H10-174617 | 6/1998 |
| JP | 2001-218621 | 8/2001 |
| JP | 2002-119330 | 4/2002 |
| JP | 3698245 | 9/2005 |
| JP | 2008-022977 | 2/2008 |
| JP | 2012-085964 | 5/2012 |
| JP | 2014-046154 | 3/2014 |
| WO | 2016/050956 | 4/2016 |

\* cited by examiner

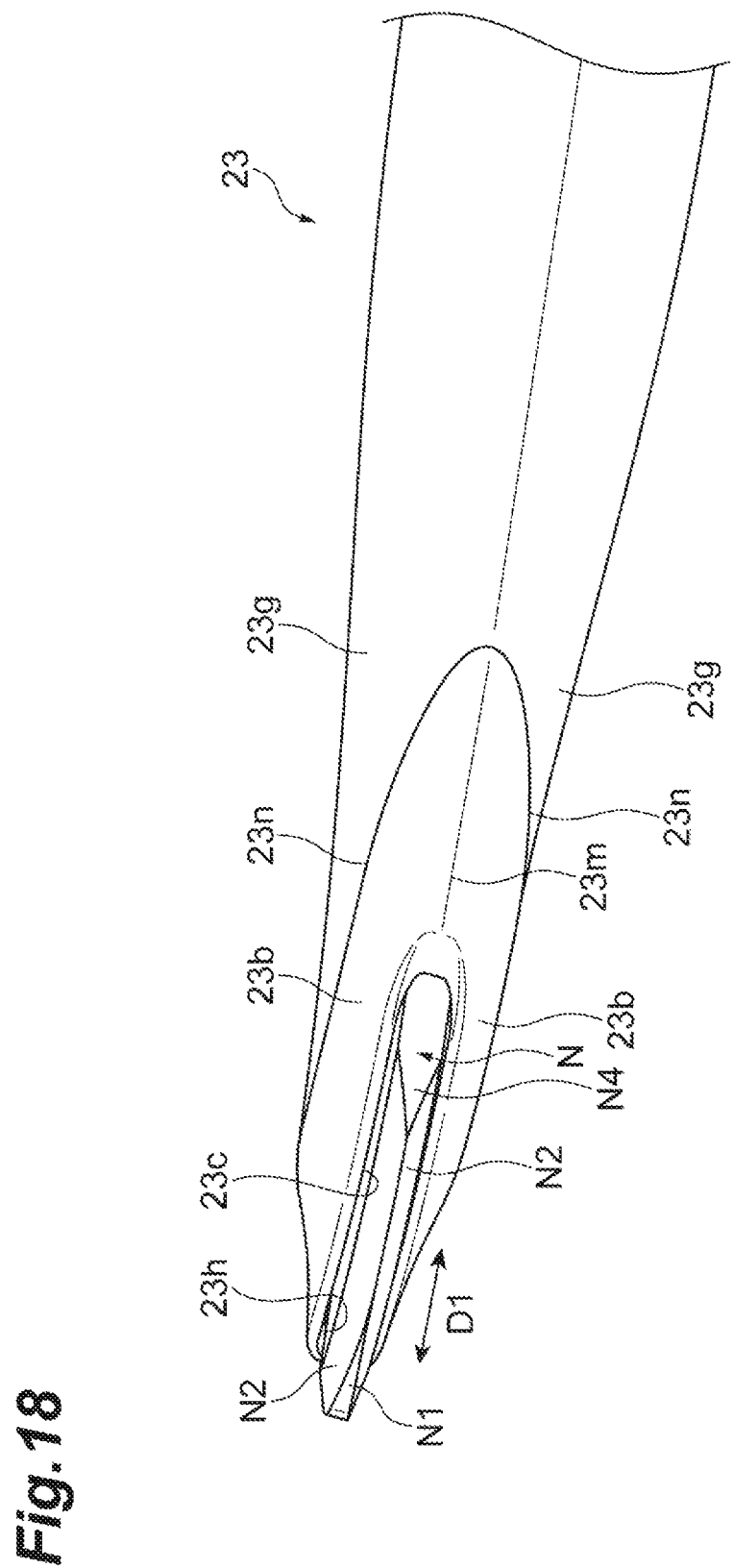

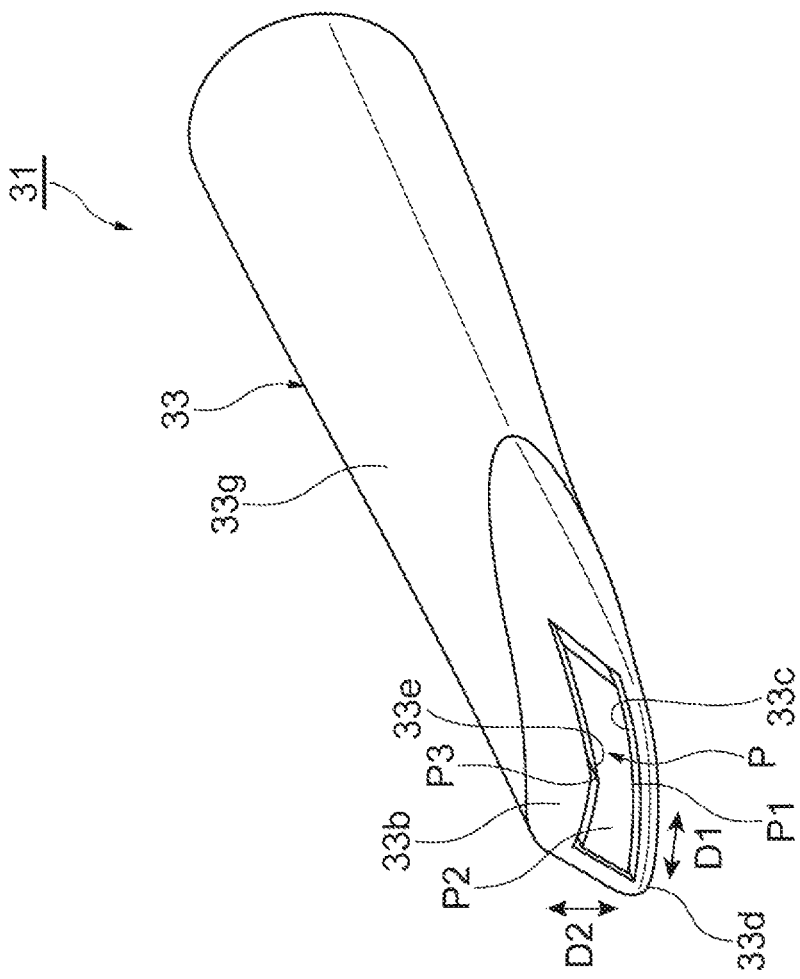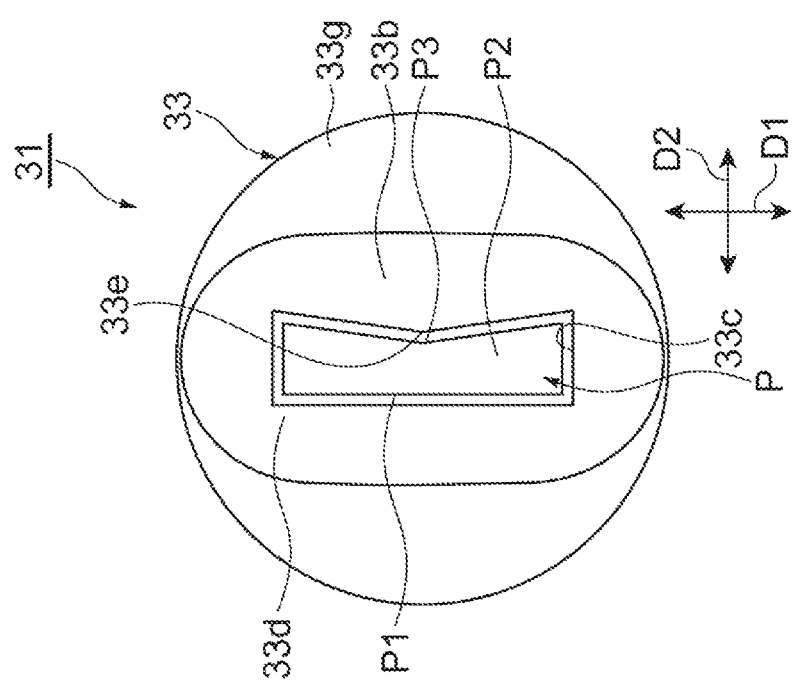

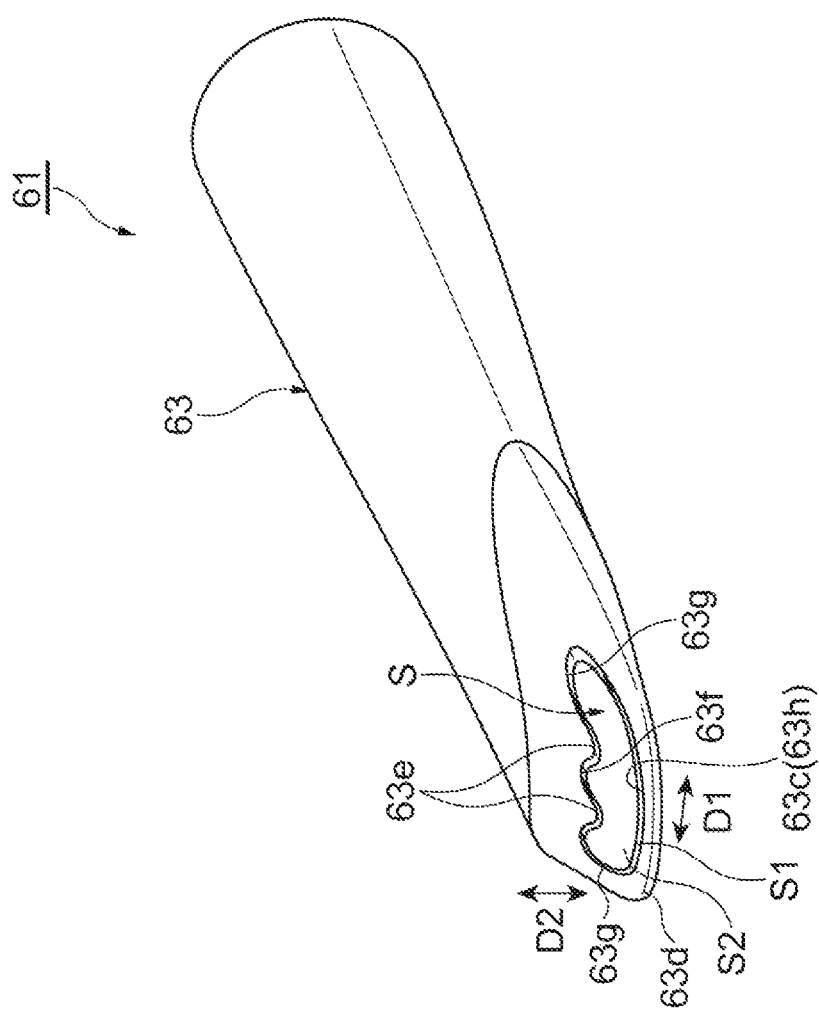
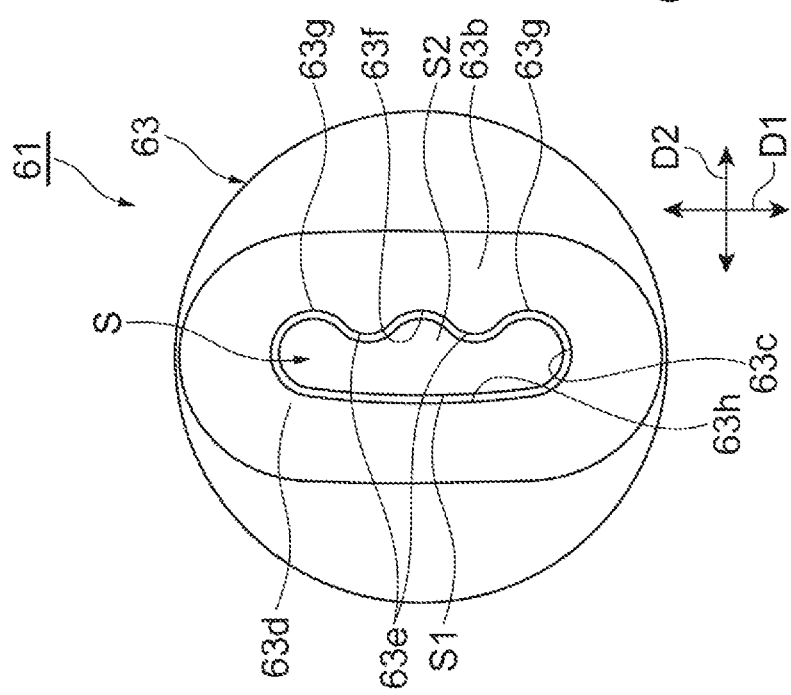

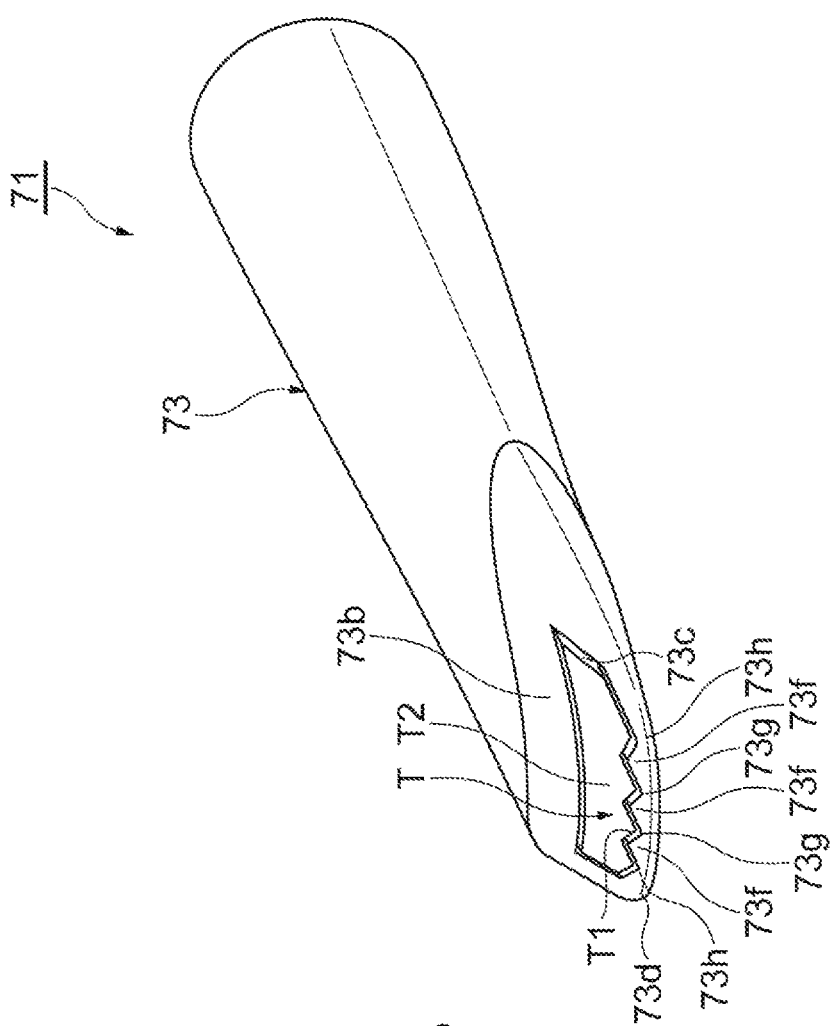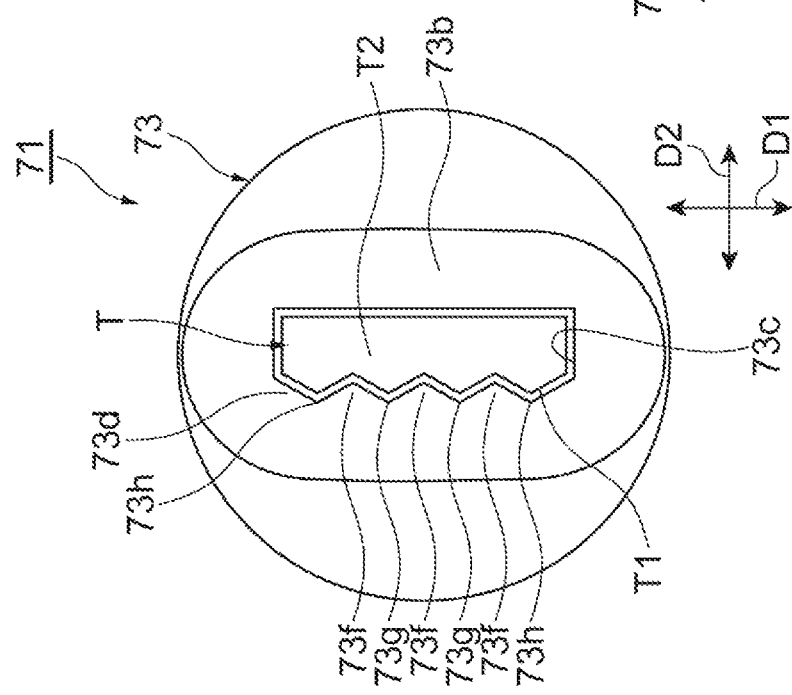

COATING MATERIAL FEEDING CONTAINER

CROSS-REFERENCE TO RELATED APPLICATION

This application is a continuation of U.S. patent application Ser. No. 16/108,061, filed on Aug. 21, 2018, now issued as U.S. Pat. No. 10,681,972, which is based upon and claims the benefit of priority from Japanese Patent Applications No. P2017-160515, filed on Aug. 23, 2017, the entire contents of which are incorporated herein by reference.

TECHNICAL FIELD

A coating material feeding container or applicator which feeds a coating material.

BACKGROUND

Japanese Unexamined Patent Publication No. 2002-119330 discloses a stick-shaped cosmetic feeding container. The stick-shaped cosmetic feeding container includes a distal tube, a container main body having a container main body tube pivotally connected to the distal tube, a core chuck pushrod having a chuck inserted into the container main body and holding a stick-shaped cosmetic material, and a cap.

A longitudinal groove is disposed on an inner surface of the container main body tube. A longitudinal rib is disposed on an outer surface of the core chuck pushrod. The longitudinal rib engages with the longitudinal groove, thereby configuring a rotation stopping mechanism of the core chuck pushrod for the container main body tube. A spiral groove is formed on an inner surface of the distal tube. A spiral engagement portion is formed on the outer surface of the core chuck pushrod. The spiral engagement portion and the spiral groove are screwed to each other, thereby configuring a screw mechanism. A feeding mechanism of a stick-shaped cosmetic material is configured to include the rotation stopping mechanism and the screw mechanism. If the distal tube and the container main body tube are rotated relative to each other, the rotation stopping mechanism and the screw mechanism are operated so as to feed the core chuck pushrod. The fed core chuck pushrod causes the stick-shaped cosmetic material to protrude from a distal end opening hole of the distal tube.

A cutting portion is disposed inside a cap of the stick-shaped cosmetic feeding container. A distal end of the stick-shaped cosmetic material comes into contact with the cutting portion. In a state where the distal end of the stick-shaped cosmetic material is in contact with the cutting portion, the stick-shaped cosmetic material is rotated. In this manner, the cutting portion cuts a distal end portion of the stick-shaped cosmetic material. A shape of the distal end of the cut stick-shaped cosmetic material is a conical shape.

SUMMARY

In the above-described stick shaped cosmetic feeding container of Japanese Unexamined Patent Publication No. 2002-119330, the distal end of the stick-shaped cosmetic material has a conical shape. Accordingly, immediately after the distal end of the stick-shaped cosmetic material is cut, a thin line can be drawn by applying a sharp peak of the distal end to the drawing. However, in a case where the distal end has a pyramid shape, the peak is rounded or made dull at a relatively earlier timing while the thin line is drawn. Consequently, the thin line cannot be gradually drawn. In some cases, the distal end may be rounded or dulled quickly. Thus, in a case where the thin line needs to be drawn, the distal end has to be cut again. Accordingly, the distal end has to be cut each time in order to draw the thin line, thereby causing a problem in that the thin line cannot be easily drawn.

Various embodiments are herein described which include a coating material feeding container or applicator which can easily draw a thin line.

Example coating material feeding containers include a solid coating material that extends in an axial direction, and a container that has a feeding mechanism for feeding the coating material in the axial direction. The container includes a distal tube for holding the coating material. A front end portion of the distal tube has a distal tube tilt surface extending in a direction tilting to the axial direction. A shape of the coating material when viewed from a front side is a shape spreading in a major axis direction and a minor axis direction. The coating material has a distal end having an acute angle shape extending along the major axis direction, and a coating material tilt surface extending from the distal end in a direction tilting to the axial direction and tilting to the minor axis direction.

The coating material feeding container includes the solid coating material that extends in the axial direction and the distal tube for holding the coating material. The shape of the coating material when viewed from the front side is the shape spreading in the major axis direction and the minor axis direction. That is, when viewed from the front side, the coating material has a shape extending longer in the major axis direction. The distal end of the coating material has an acute angle shape, and extends in the major axis direction. Accordingly, the distal end of the coating material extending in the major axis direction is applied to a coating target portion, and the coating material is moved along the major axis direction. In this manner, a thin line can be finely drawn on the coating target portion. The distal end of the coating material has the shape extending in the major axis direction. Accordingly, compared to a case where the distal end has a pyramid shape, the distal end is unlikely to be rounded or made dull even if the coating material is continuously performed or applied to the coating target portion for an extended period of time. Accordingly, when the thin line is drawn, labor and time for cutting the coating material can be saved. Therefore, the thin line can be easily drawn.

In addition, the distal end may linearly extend along the major axis direction. In this case, the distal end of the coating material has a linear shape extending longer in the major axis direction. Accordingly, if the coating is performed by moving the coating material along the major axis direction, the thin line can be finely drawn along the distal end having the linear shape. Therefore, the thin line can be smoothly drawn along the distal end.

In addition, the coating material tilt surface may be formed along the distal tube tilt surface, and may be formed on one side in the minor axis direction with respect to the distal end. In this case, the coating material tilt surface is formed on one side of the distal end of the coating material, and the coating material tilt surface is formed along the distal tube tilt surface. Accordingly, the coating material is cut by moving a cutting tool such as a cutter along the distal tube tilt surface. In this manner, the coating material tilt surface can be easily formed. Therefore, it is possible to easily form the coating material including the distal end and the coating material tilt surface which can finely draw the thin line.

In addition, the coating material tilt surface may be formed along the distal tube tilt surface, and may be formed on both sides in the minor axis direction with respect to the distal end. In this case, the coating material tilt surface is formed on both sides of the distal end of the coating material, and the distal tube tilt surface is formed on an extension line of the coating material tilt surface. Accordingly, when the coating material is cut along the distal tube tilt surface, the coating material tilt surface is naturally exposed on the distal end of the distal tube. Therefore, the coating can be performed immediately after the coating material is cut. That is, even if the coating material is not fed immediately after the coating material is cut, the coating material can be used in the coating. Therefore, the thin line can be more easily drawn.

In addition, the coating material tilt surface and the distal tube tilt surface may have a curved surface which linearly extends along an acute angle line tilting to the axial direction, and which is curved outward so as to form a curved, convex or rounded portion of the coating material and the distal tube. In this case, the coating material tilt surface and the distal tube tilt surface have the curved surface which is curved outward. Therefore, the distal end portion of the coating material can have a curve shape.

In addition, the distal end may have a curve shape which is curved outward so as to form a curved, convex or rounded portion of the coating material. In this case, the distal end has the curve shape which is curved outward. Accordingly, a thin and short line or a thin and long line can be more easily drawn by applying the distal end to the coating target portion. That is, in a case where the distal end is curved outward, the coating is performed along the distal end. In this manner, it is possible to more easily draw a hair-like thin and short line or a hair-like thin and long line.

In addition, the distal tube may have an opening portion for holding the coating material, and the opening portion may be formed so as to extend from a front end thereof to one side and a rear side in the major axis direction. In this case, the opening portion extends to one side in the major axis direction. In this manner, an inner wall surface facing the coating material can be disposed on the other side of the opening portion in the major axis direction.

In addition, the opening portion may have the inner wall surface facing the coating material, on the other side in the major axis direction. In this case, when the coating is performed using the coating material or when the coating material is cut, even if an external force is applied to the coating material, loss and breakage of the coating material can be suppressed, reduced or eliminated. That is, when the external force is applied to the coating material, the coating material is pushed against the inner wall surface, and the inner wall surface holds the coating material. In this manner, it is possible to prevent the loss and the breakage of the coating material.

Accordingly, a thin line can be easily drawn.

BRIEF DESCRIPTION OF THE DRAWINGS

FIG. 18 is a perspective view when the vicinity of the distal end of the coating material feeding container in FIG. 13 is viewed in a direction different from that in FIG. 17.

FIG. 19A is a front view illustrating a coating material and a distal tube according to a third group of embodiments.

FIG. 19B is a perspective view illustrating the coating material and the distal tube in FIG. 19A.

FIG. 22A is a front view illustrating a coating material and a distal tube according to a sixth group of embodiments.

FIG. 22B is a perspective view illustrating the coating material and the distal tube in FIG. 22A.

FIG. 23A is a front view illustrating a coating material and a distal tube according to a seventh group of embodiments.

FIG. 23B is a perspective view illustrating the coating material and the distal tube in FIG. 23A.

DETAILED DESCRIPTION

In the following description, with reference to the drawings, the same reference numbers are assigned to the same components or to similar components having the same function, and overlapping description is omitted.

First Group of Embodiments

Figure 1:
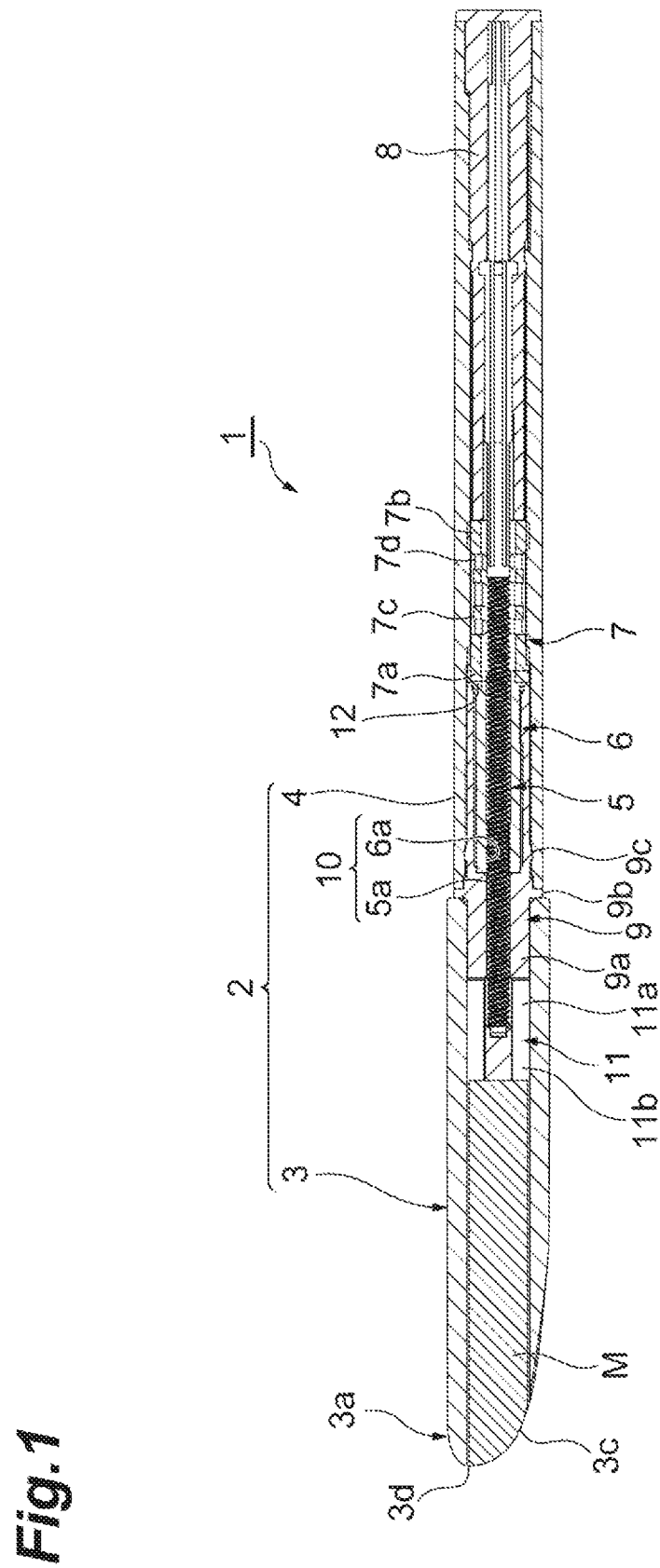
FIG. 1 is a sectional view when a coating material feeding container according to a first group of embodiments is cut along a plane including an axial direction and a major axis direction.
Figure 2:
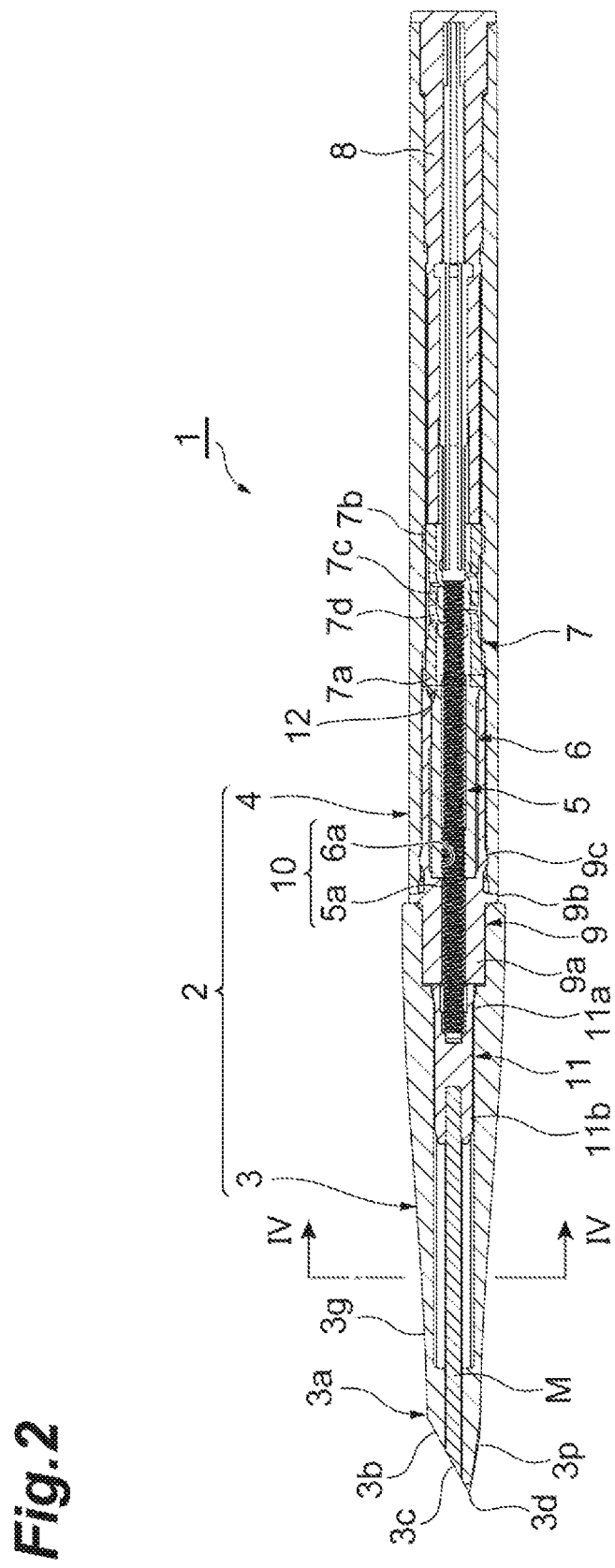
FIG. 2 is a sectional view when the coating material feeding container in FIG. 1 is cut along a plane including the axial direction and a minor axial direction.

As illustrated in FIGS. 1 and 2, a coating material feeding container 1 has a satisfactory appearance in which an overall shape forms an elongated round stick shape as in a writing tool, and a cap C (refer to FIGS. 12A and 12B) is mounted thereon. The coating material feeding container 1 includes a solid coating material M. For example, the coating material M may comprise a stick-shaped cosmetic material, but may also comprise a drawing material. The coating material M may comprise an eyebrow pencil, and the coating material feeding container 1 may comprise an eyebrow feeding container.

For example, the coating material feeding container 1 includes a tubular container 2 including a distal tube 3 configuring a container front portion and a container main body 4 configuring a container rear portion, a mobile body 5 accommodated inside the container 2, a female screw member 6 accommodated inside the container main body 4, a spring member 7 disposed behind the female screw member 6, a tubular tail plug 8 extending in an axial direction rearward of the container main body 4 and inside the container main body 4, and an intermediate tube 9 located between the distal tube 3 and the container main body 4.

Figure 3:
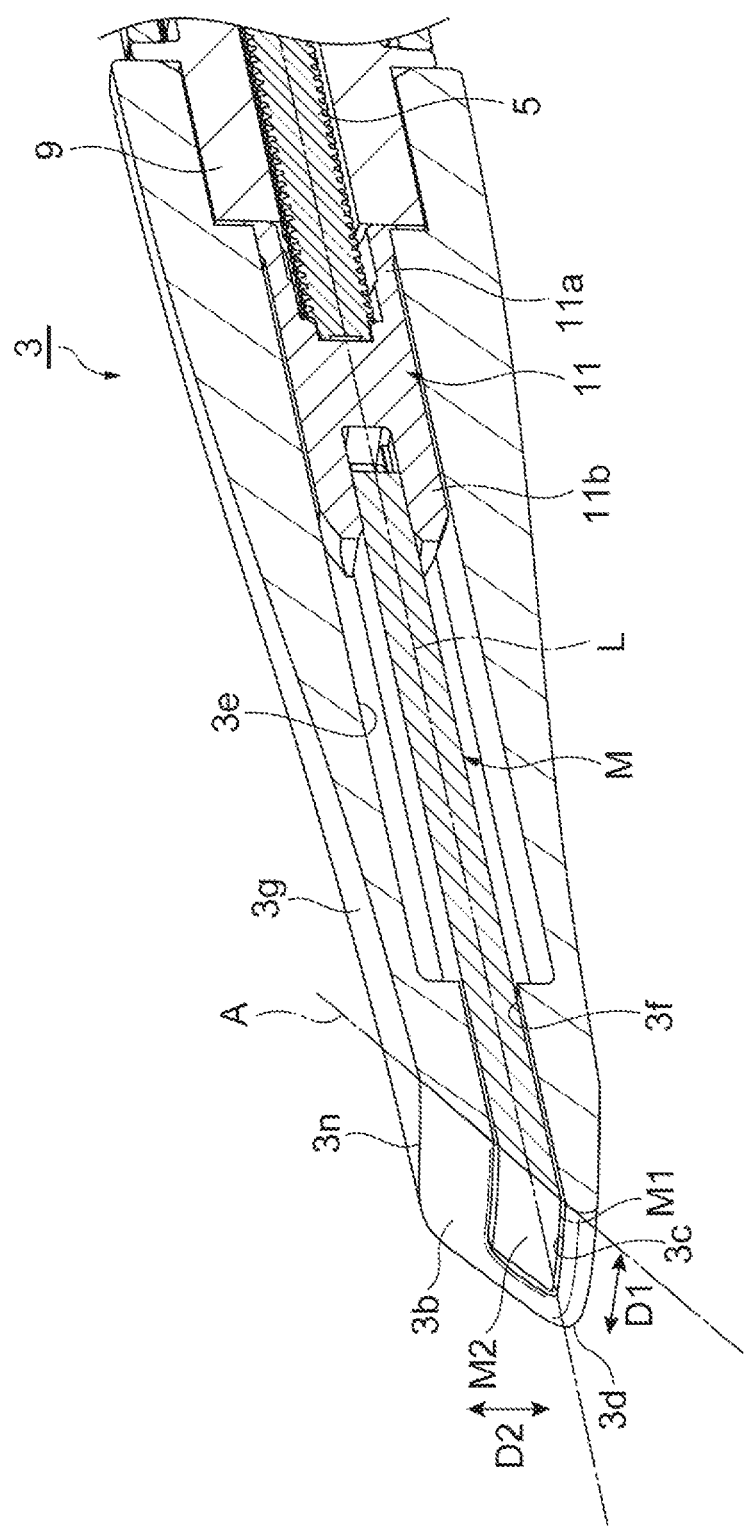
FIG. 3 is an enlarged sectional perspective view of the vicinity of a distal end of the coating material feeding container in FIG. 1.

In the description herein, an "axial line" represents a center line extending forward and rearward of the coating material feeding container 1, and an "axial direction" represents a forward and rearward direction and a direction extending along an axial line L (refer to FIG. 3). A feeding direction of the coating material M is set as a forward direction (forward moving direction), and a direction opposite thereto is set as a rearward direction.

As a whole, the distal tube 3 has an elongated tubular shape extending in the axial direction. A front end portion 3a of the distal tube 3 has a distal tube tilt surface 3b tilting to the axial direction. An opening portion 3c through which the coating material M is exposed is formed in the front end portion 3a of the distal tube 3. The opening portion 3c has a shape in which one side of a side surface of the distal tube 3 is cut out, and extends obliquely rearward from a front end 3d of the distal tube 3. The front end portion 3a indicates a prescribed region on a front side of the distal tube 3 including the front end 3d. The distal tube 3 will be described in detail later.

The intermediate tube 9 has a front side portion 9a inserted into the distal tube 3 from the rear, a flange portion 9b expanding outward, and a rear side portion 9c located behind the flange portion 9b and inserted into the container main body 4 from the front. The intermediate tube 9 is fixed to the distal tube 3 in a state where the front side portion 9a is inserted into the distal tube 3. The rear side portion 9c has a tubular shape, and the female screw member 6 is inserted into the rear side portion 9c from the rear. The female screw member 6 is formed in a substantially cylindrical shape. A female screw 6a configuring one side of a screw portion 10 is disposed on a front side of an inner peripheral surface of the female screw member 6, and a mobile body 5 is screwed into the female screw 6a.

As a whole, the mobile body 5 has a round stick shape. The mobile body 5 is located inside the distal tube 3, the intermediate tube 9, the female screw member 6, and the spring member 7, and extends in the axial direction. The mobile body 5 is movable in the axial direction with respect to the distal tube 3, the intermediate tube 9, the female screw member 6, and the spring member 7. An outer peripheral surface of the mobile body 5 includes a male screw 5a configuring the other side of the screw portion 10.

A ratchet mechanism 12 which allows only the feeding of the coating material M by allowing relative rotation of the distal tube 3 and the container main body 4 in only one direction is disposed between the female screw member 6 and the spring member 7. For example, the ratchet mechanism 12 is formed using projections disposed in the front end of the spring member 7 and holes disposed in the rear end of the female screw member 6. The projections project outward in the axial direction from the front end of the spring member 7, and are juxtaposed with each other along the circumferential direction. The holes are disposed in the rear end of the female screw member 6 having the tubular shape, and can respectively engage (click) with the projections to provide a ratcheting function.

The spring member 7 is formed in a tubular shape. The spring member 7 has a function to protect the coating material feeding container 1 by absorbing or reducing an impact transmitted to the inside of the coating material feeding container 1 when an external force is applied such as when the coating material feeding container 1 is dropped. For example, the front end of the spring member 7 is pushed rearward from the rear end of the female screw member 6 via the above-described projections and holes. The spring member 7 includes a front side tube portion 7a abutting on the female screw member 6, a rear side tube portion 7b engaging with the inner surface of the container main body 4 in the vicinity of the center in the axial direction of the container main body 4, and a spring portion 7c for connecting the front side tube portion 7a and the rear side tube portion 7b to each other.

The spring portion 7c may comprise a so-called resin spring which can stretch and contract in the axial direction. The spring portion 7c is formed using a slit 7d spirally extending along a peripheral surface thereof and allowing the interior and the exterior to communicate with each other. When the external force is applied, the spring portion 7c stretches and contracts, thereby relaxing the impact applied to the coating material feeding container 1.

A coating material support portion 11 for supporting the coating material M is accommodated inside the distal tube 3. The coating material support portion 11 is interposed between the coating material M and the mobile body 5. The mobile body 5 is rotatable relative to the coating material support portion 11. As a whole, the coating material support portion 11 has a stick shape extending in the axial direction. The rear side of the coating material support portion 11 includes a first tube portion 11a into which the mobile body 5 is inserted, and the front side of the coating material support portion 11 includes a second tube portion 11b into which the coating material M is inserted. The coating material support portion 11 supports the coating material M by inserting the coating material M into the second tube portion 11b from the front side.

Next, the distal tube 3 and the coating material M will be described in detail. As illustrated in FIG. 3, the distal tube 3 internally has a first accommodation space 3e and a second accommodation space 3f which accommodate the coating material M. The first accommodation space 3e is disposed behind the second accommodation space 3f, and accommodates the coating material M and the coating material support portion 11. The second accommodation space 3f is located on the front side of the first accommodation space 3e, and is narrower than the first accommodation space 3e.

Only the coating material M is inserted into the second accommodation space 3f. The second accommodation space 3f communicates with the opening portion 3c of the front end 3d of the distal tube 3.

Figure 4:
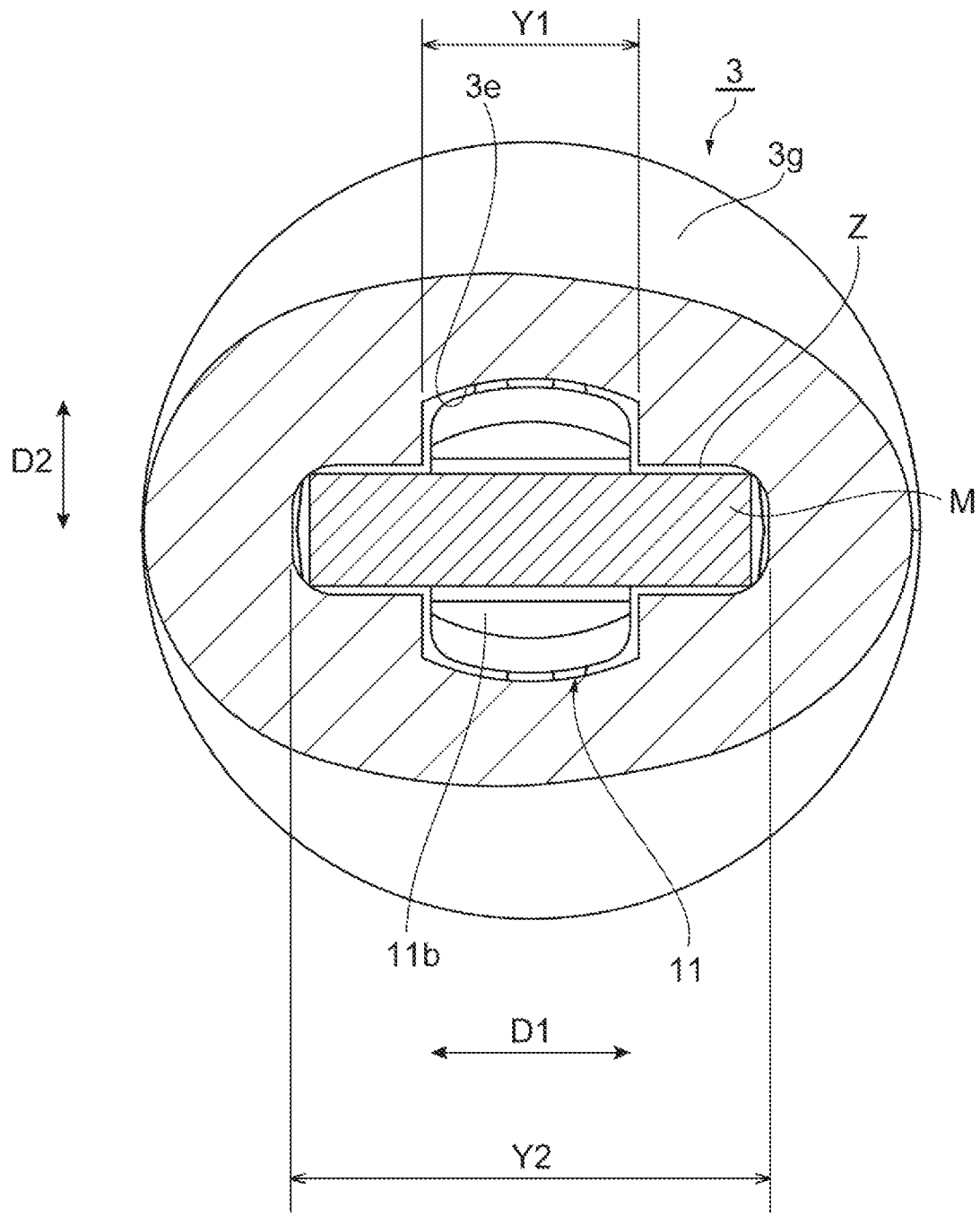
FIG. 4 is a sectional view taken along line IV-IV in FIG. 2.

As illustrated in FIGS. 3 and 4, the coating material M extends in a major axis direction D1 and a minor axis direction D2 inside the distal tube 3. The second accommodation space 3f has a shape extending in the major axis direction D1 and the minor axis direction D2, and maintains the same shape along the axial direction. A width Y1 (length in the major axis direction D1) of the first accommodation space 3e of the distal tube 3 is narrower than a width Y2 of the second accommodation space 3f, and a clearance Z between the coating material M and the distal tube 3 is constant along the axial direction. In this way, the width Y1 of the first accommodation space 3e is set to be narrower than the width Y2 of the second accommodation space 3f, and the clearance Z is set to be constant along the axial direction. In this manner, it is possible to suppress, reduce or eliminate rattling of the coating material M inside the distal tube 3.

The outer surface of the distal tube 3 includes a distal tube tilt surface 3b extending from the above-described front end 3d, and a rear side tilt surface 3g extending rearward from the distal tube tilt surface 3b. A boundary line 3n extends between the distal tube tilt surface 3b and the rear side tilt surface 3g. Both the distal tube tilt surface 3b and the rear side tilt surface 3g extend in a direction tilting to the axial direction. A tilt angle of the distal tube tilt surface 3b with respect to the axial direction is larger than a tilt angle of the rear side tilt surface 3g with respect to the axial direction.

Figure 5:
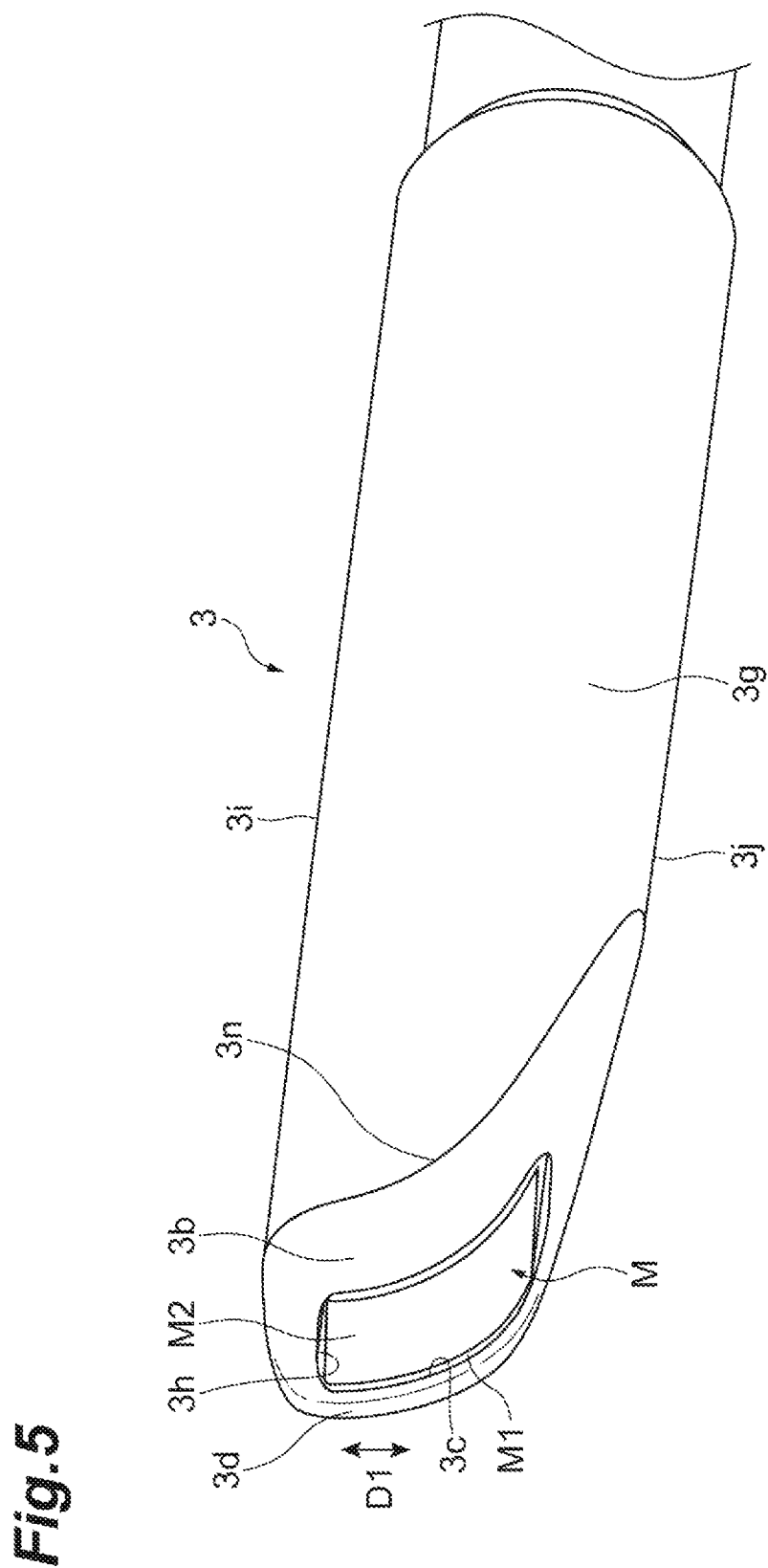
FIG. 5 is an enlarged perspective view of the vicinity of the distal end of the coating material feeding container in FIG. 1.
Figure 6:
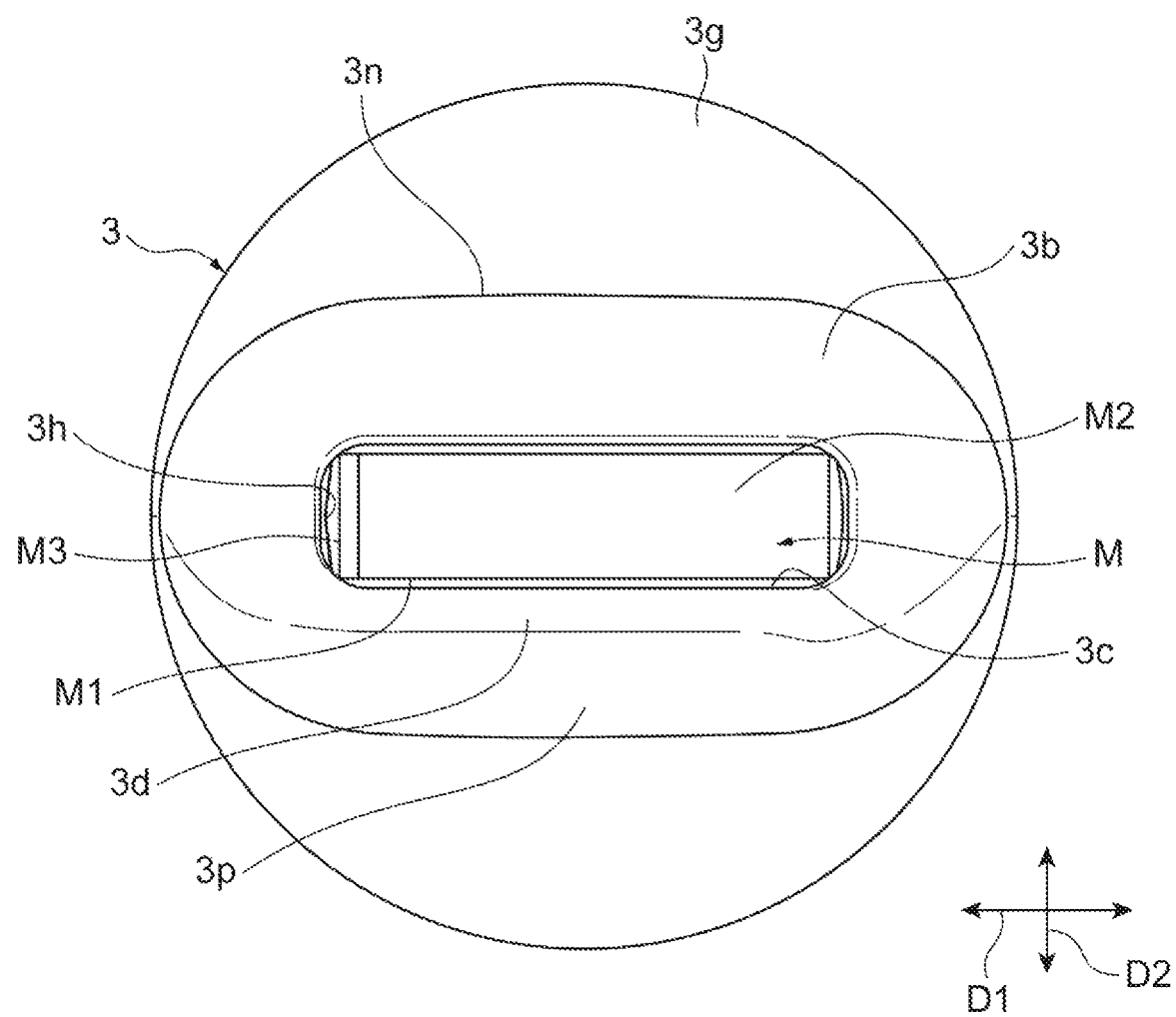
FIG. 6 is a front view illustrating a coating material and a distal tube when viewed from a front side.

As illustrated in FIGS. 3, 5, and 6, the coating material M has a distal end M1 which is fed forward from the opening portion 3c, and which extends along the major axis direction D1 intersecting the axial direction. An outline shape of the coating material M, when viewed from the front end of the container 2, appears to extend perpendicular to the longitudinal axial direction of the coating material feeding container in the major axis direction D1 associated with a width of the coating material M and the minor axis direction D2 associated with a height of the coating material M. In some examples, the width of the coating material M is greater than the height. A leading edge of the distal end M1 is oriented along the width of the coating material M. In some examples, the distal end M1 has an acute angle shape.

The coating material M has a coating material tilt surface M2 extending from the leading edge of the distal end M1 in a direction tilting to the axial direction. The coating material tilt surface M2 extends in a direction tilting to both the axial direction and the minor axis direction D2. The coating material tilt surface M2 is a surface formed along the distal tube tilt surface 3b of the distal tube 3. For example, the tilt angle of the coating material tilt surface M2 is substantially the same as the tilt angle of distal tube tilt surface 3b.

When viewed from the front side, the shape of the distal tube 3 is circular as a whole, and the front end 3d has a shape extending in the major axis direction D1. When viewed from the front side, the distal tube tilt surface 3b is disposed on one side in the minor axis direction D2 of the front end 3d, and the shape of the distal tube tilt surface 3b is an oval shape extending in the major axis direction D1 and the minor axis direction D2. The distal tube tilt surface 3b is disposed on one side (upper side in FIG. 6) in the minor axis direction D2 with respect to the front end 3d, and the coating material tilt surface M2 is formed on one side in the minor axis direction D2 with respect to the distal end M1. The distal tube tilt surface 3b is disposed along an extension line of the coating material tilt surface M2.

Figure 7:
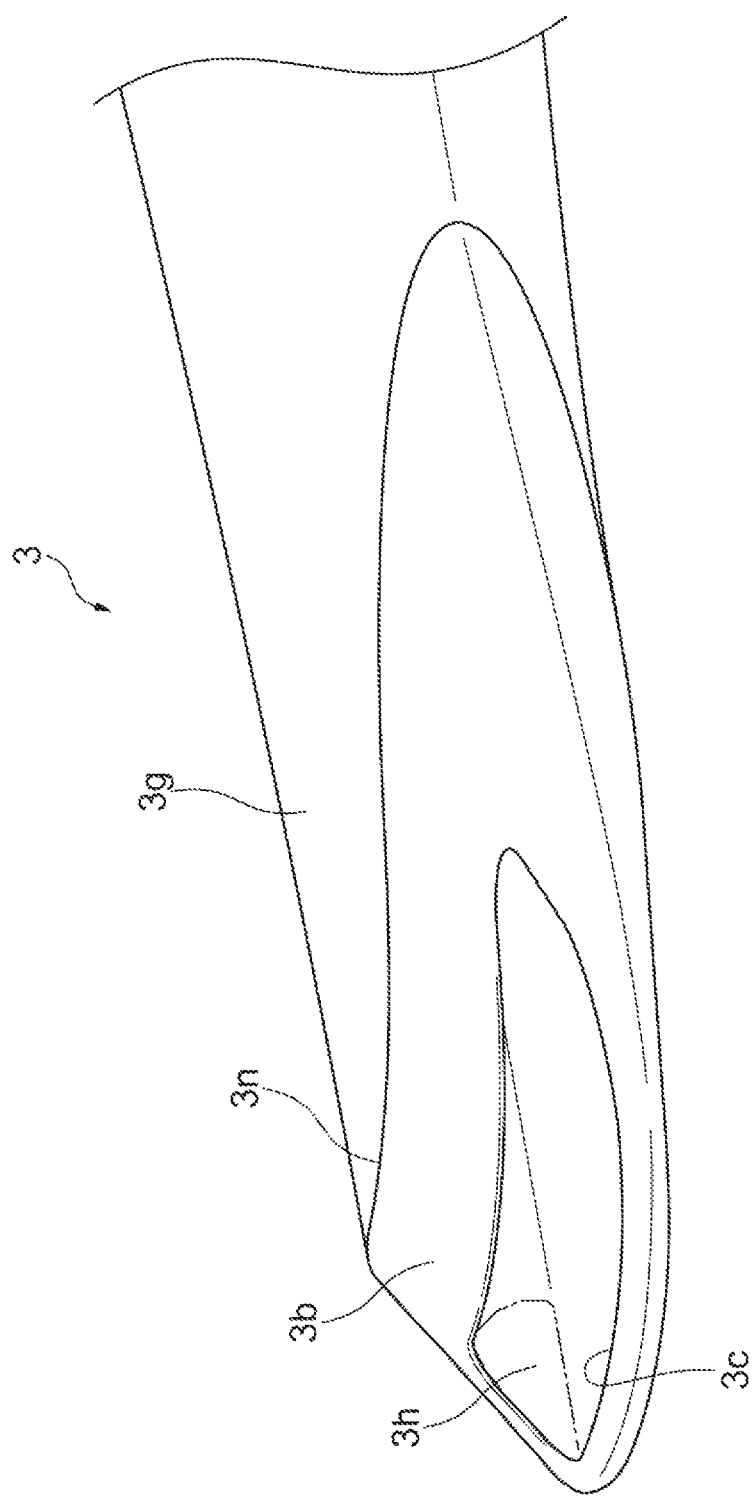
FIG. 7 is an enlarged perspective view illustrating an inner wall surface of the distal tube.

As illustrated in FIGS. 6 and 7, the distal tube 3 has an inner wall surface 3h facing the coating material M, inside the opening portion 3c. The inner wall surface 3h faces a first side surface M3 facing one side in the major axis direction D1 of the coating material M. The first side surface M3 has a flat shape. The distal tube tilt surface 3b has a curved shape which curves backward toward the rear end surface 3g or the rear end of the distal tube 3 from the front end 3d located on a first side 3i (refer to FIG. 5) of the distal tube 3 to a second side 3j of the distal tube 3 opposite the first side 3i. The opening portion 3c is formed so as to extend backward to the rear end of the distal tube 3 from the front end 3d on the first side 3i to the second side 3j. The inner wall surface 3h faces the coating material M on the first side 3i of the distal tube 3, and in some examples the opening portion 3c comprises a curved opening that exposes the coating material M on the second side 3j of the distal tube 3.

Figure 8:
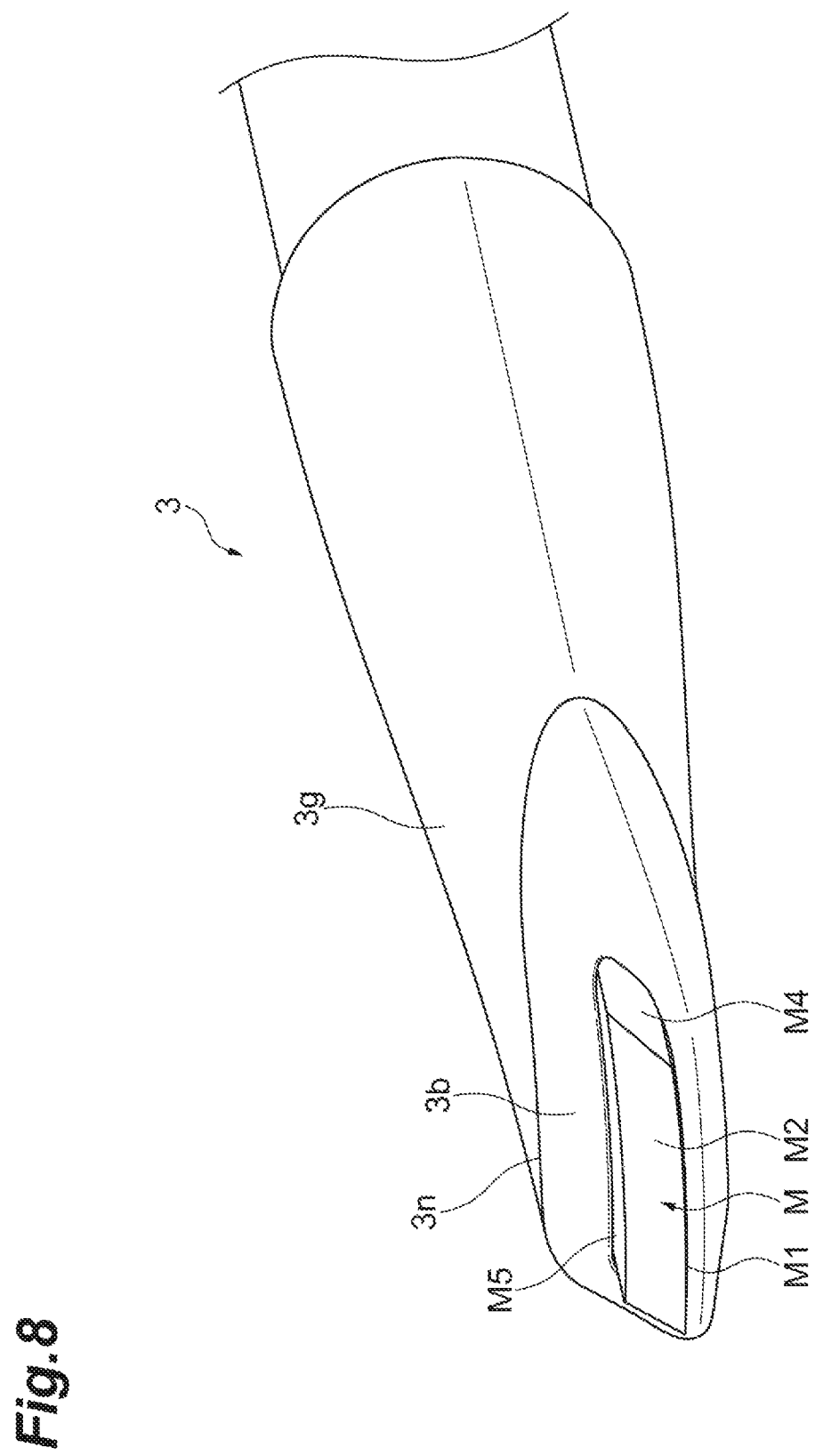
FIG. 8 is a perspective view illustrating the vicinity of the distal end of the coating material feeding container.
Figure 9:
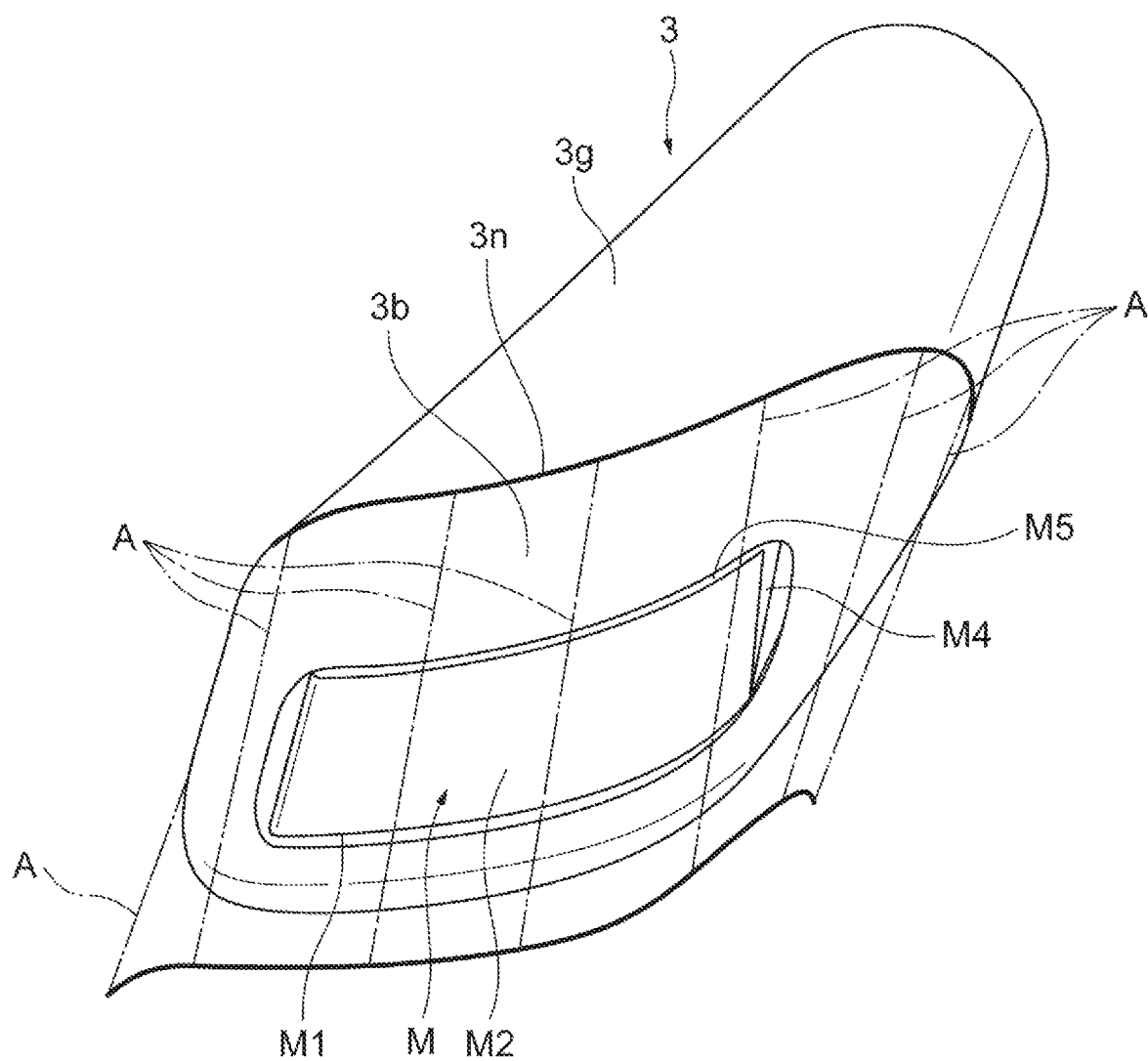
FIG. 9 is a perspective view for describing each shape of the coating material and the distal tube.

As illustrated in FIGS. 8 and 9, the coating material tilt surface M2 has a curved surface shape which is curved outward so as to form a curved or rounded portion of the coating material M. The coating material tilt surface M2 is curved so as to bulge outward of the coating material M and the distal tube 3. The coating material tilt surface M2 and the distal tube tilt surface 3b are respectively curved surfaces which linearly extend along an acute angle line A tilting to both the axial direction and the minor axis direction D2, and which are curved outward so as to form a curved or rounded portion of the coating material M and the distal tube 3.

That is, when the acute angle line A having an acute angle with respect to the axial line L is moved so as to form a curved or rounded portion of the coating material M and the distal tube 3, a trajectory of the acute angle line A forms the coating material tilt surface M2 and the distal tube tilt surface 3b. A flat second side surface M4 is disposed on a side of the coating material tilt surface M2 which is opposite to the first side surface M3. A flat third side surface M5 is disposed on one side in the minor axis direction D2 of the coating material tilt surface M2.

Figure 10:
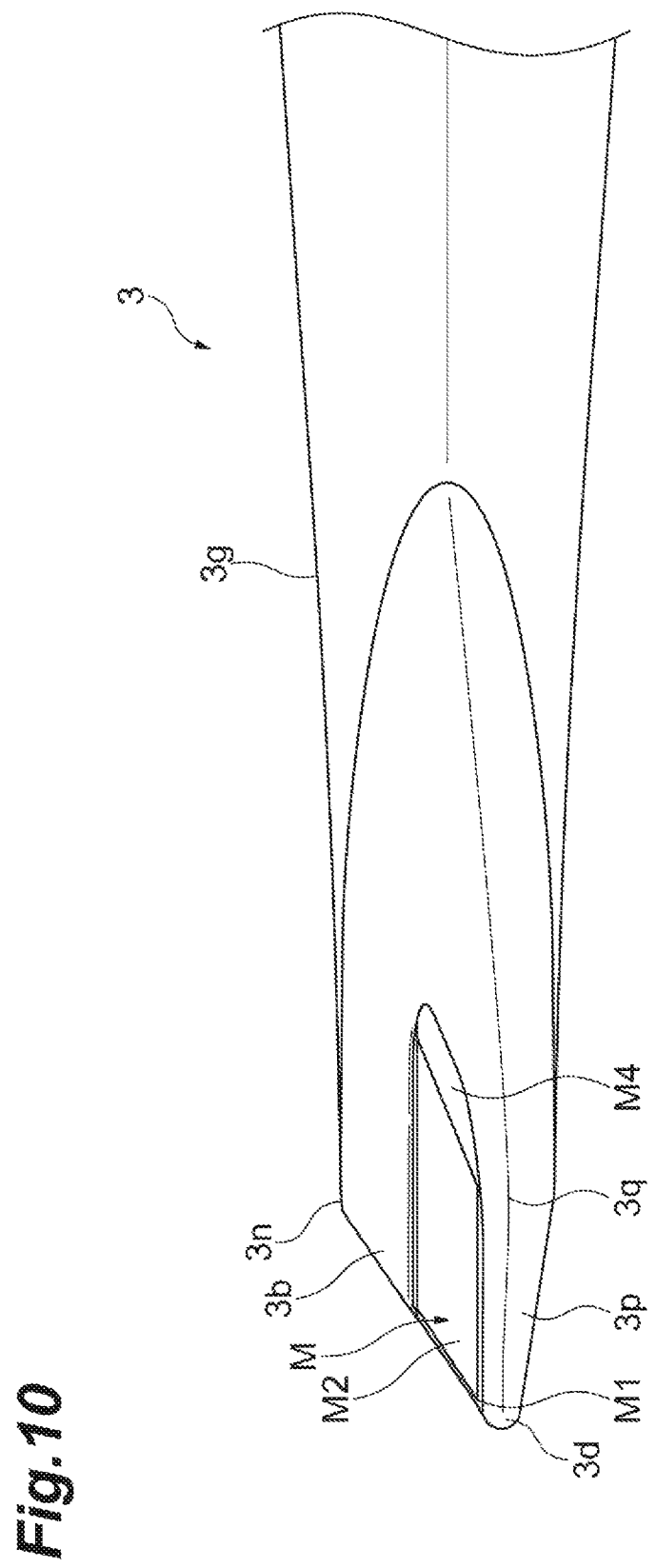
FIG. 10 is a perspective view illustrating the coating material and the distal tube.
Figure 11:
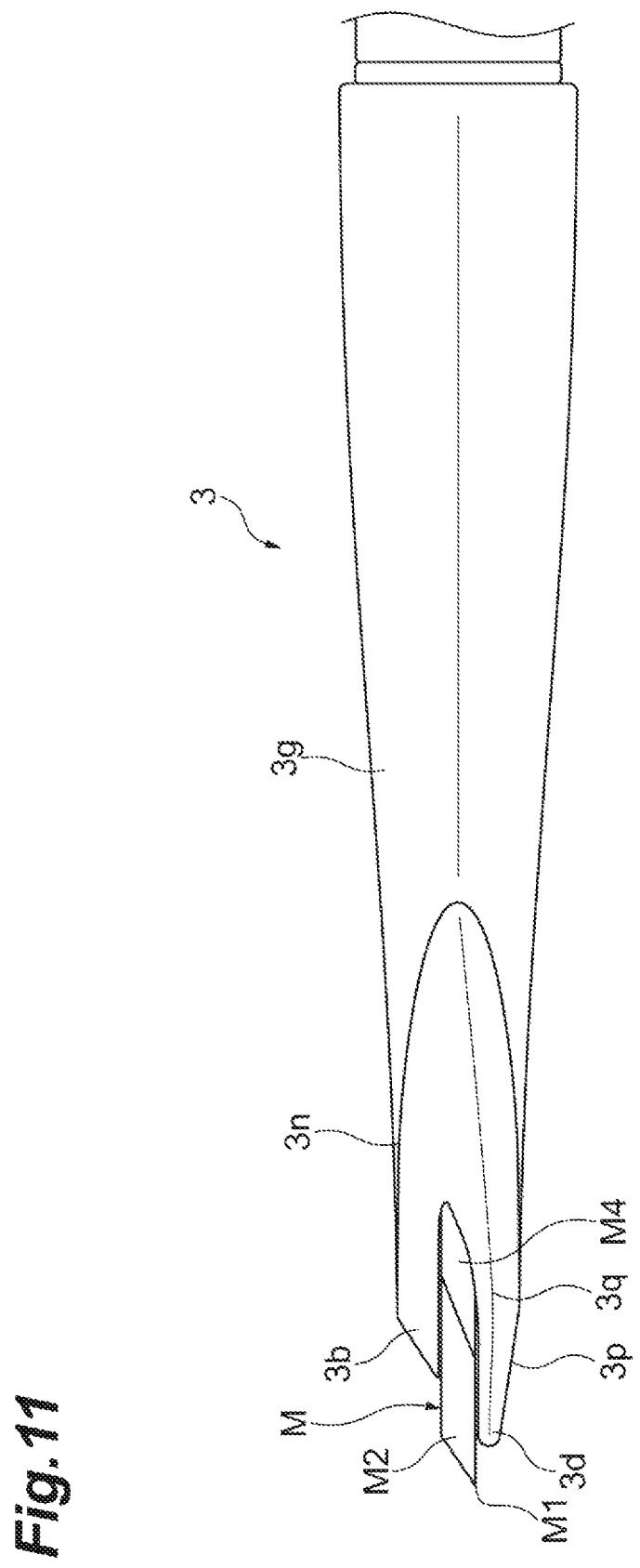
FIG. 11 is a perspective view illustrating a state where the coating material is fed from the distal tube in FIG. 10.

As illustrated in FIGS. 10 and 11, the front end 3d of the distal tube 3 is curved outward so as to form a curved or rounded portion of the distal tube 3. The distal tube tilt surface 3b is curved so as to bulge outward of the coating material M and the distal tube 3. When viewed from the front end 3d, a tilt surface 3p is disposed on an opposite side of the distal tube tilt surface 3b. The tilt surface 3p tilts to the opposite side of the distal tube tilt surface 3b and the coating material tilt surface M2 with respect to the axial direction. An angle formed between the tilt surface 3p and the distal tube tilt surface 3b is set as the acute angle. A boundary portion 3q extending rearward from the front end 3d is disposed between the distal tube tilt surface 3b and the tilt surface 3p. The boundary portion 3q is contiguous with the front end 3d, and linearly extends rearward of the distal tube 3 from the front end 3d.

Figure 12:
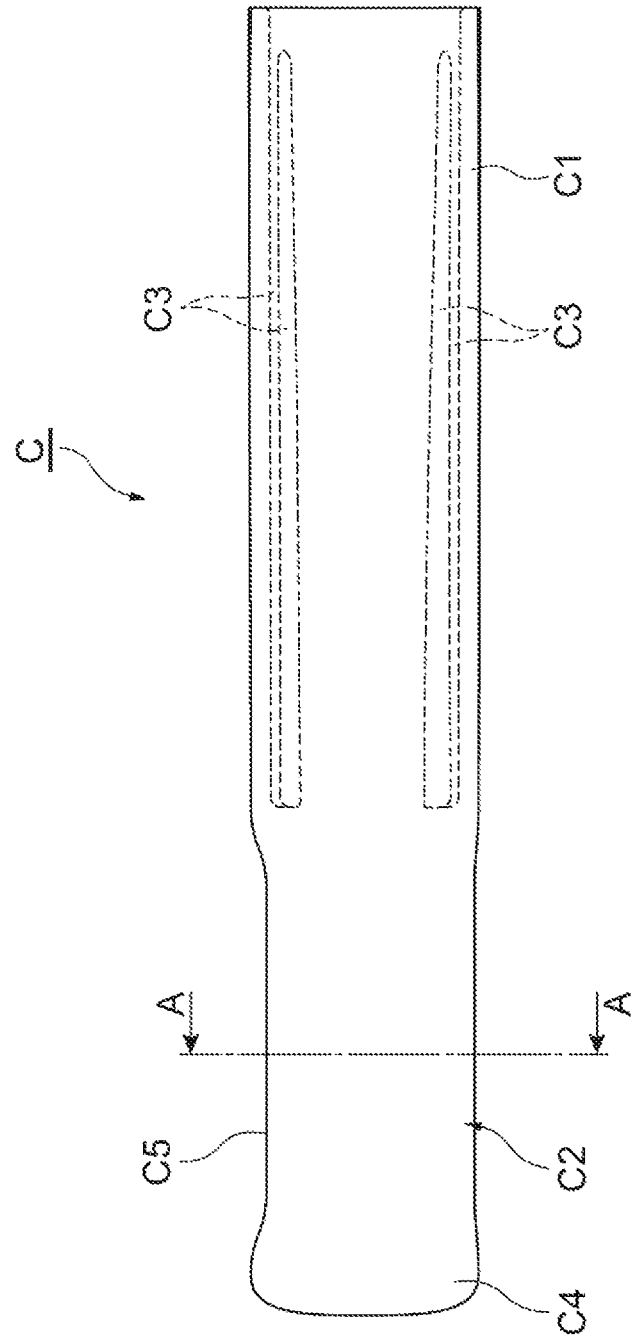
FIG. 12A is a sectional view taken along line A-A of a cap illustrated in FIG. 12B.
FIG. 12B is a side view of the cap in FIG. 12A.

The cap C illustrated in FIGS. 12A and 12B is mounted on the distal tube 3. The cap C is formed in a stick shape extending in the axial direction. The cap C includes a tubular portion C1 which is oriented rearward and into which the distal tube 3 is inserted from the rear, and a cutting portion C2 located in front of the tubular portion C1. For example, the tubular portion C1 and the cutting portion C2 are molded integrally with each other. An inner peripheral surface of the tubular portion C1 has a plurality of projections C3 engaging with the inserted distal tube 3. The distal tube 3 is inserted in between the plurality of projections C3 extending in the axial direction, thereby causing the distal tube 3 to engage with the cap C.

The cutting portion C2 includes a distal end portion C4 which has an oval shape when viewed from the front side, and a cutter portion C5 which is located behind the distal end portion C4. A sectional shape when the cutter portion C5 is cut along a plane orthogonal to the longitudinal direction of the cap C is a shape (e.g., tear shape) including an end portion sharpened so that one end portion extending along a major axis of an oval protrudes in the major axis direction.

The coating material M can be cut by detaching the cap C from the distal tube 3 and applying the cutter portion C5 to the coating material M. Specifically, the cap C is held with a hand, the cutter portion C5 is moved along the distal tube tilt surface 3b (or the acute angle line A) of the distal tube 3 so as to cut the coating material M. In this manner, the coating material tilt surface M2 extending along the distal tube tilt surface 3b is formed, as illustrated in FIG. 10.

A feeding example of the coating material M will be described. As illustrated in FIGS. 1 and 2, when the coating material M is fed from the distal tube 3, the distal tube 3 and the container main body 4 are relatively rotated in one direction (for example, clockwise) in a state where the cap C is detached. Then, the distal tube 3, the intermediate tube 9, and the female screw member 6 are synchronously rotated, and the container main body 4, the spring member 7, the tail plug 8, and the mobile body 5 are synchronously rotated. In this manner, a screwing operation of the screw portion 10 configured to include the female screw 6a of the female screw member 6 and the male screw 5a of the mobile body 5 is performed so that the mobile body 5 moves forward.

As the mobile body 5 moves forward, the coating material M is caused to protrude forward from the opening portion 3c of the distal tube 3, thereby feeding the coating material M. As the coating material M is applied to a coating target portion, coating is performed using the coating material M. The distal tube 3, the container main body 4, the mobile body 5, the female screw member 6, the spring member 7, the tail plug 8, and the intermediate tube 9 which are described above configure a feeding mechanism for feeding the coating material M in the axial direction.

As described above, the coating material feeding container 1 includes the solid coating material M extending in the axial direction, and the distal tube 3 for holding the coating material M. As illustrated in FIGS. 3, 5, and 6, the shape of the coating material M when viewed from the front side is the shape spreading in the major axis direction D1 and the minor axis direction D2. When viewed from the front side, the coating material M has a shape extending longer in the major axis direction D1. The distal end M1 of the coating material M has the acute angle shape, and extends in the major axis direction D1. Accordingly, the distal end M1 of the coating material M extending in the major axis direction D1 is applied to the coating target portion, and the coating material M is moved along the major axis direction D1. In this manner, a thin line can be finely drawn on the coating target portion.

Since the distal end M1 of the coating material M has the shape extending in the major axial direction D1, for example, compared to a case where the distal end of the coating material has a pyramid shape, the distal end M1 is unlikely to be rounded or made dull even if the coating is continuously performed or applied to the coating target portion for an extended period of time. Accordingly, when the thin line is drawn, labor and time for cutting the coating material M can be saved. Therefore, the thin line can be easily drawn.

Furthermore, in a case where the distal end M1 is rounded or dulled after the coating is continuously performed using the coating material M, the coating material M is slightly fed so that the cutter portion C5 or a cutter cuts the coating material M along the distal tube tilt surface 3b. In this manner, the distal end M1 can easily restore the acute angle shape, and the thin line can be easily drawn. Even if the coating material M is polished along the distal tube tilt surface 3b with those which have a surface having different roughness, such as paper, sandpaper, a film whose surface is unevenly processed, or tissue paper, it is possible to easily reproduce the distal end M1 having a desired acute angle.

The distal end M1 linearly extends along the major axis direction D1. That is, the distal end M1 of the coating material M linearly extends longer in the major axial direction D1. Therefore, if the coating is performed by moving the coating material M along the major axis direction D1, the thin line can be finely drawn along the linear distal end M1. Therefore, the thin line can be smoothly drawn along the distal end M1.

The coating material tilt surface M2 is formed along the distal tube tilt surface 3b, and is formed on one side in the minor axis direction D2 with respect to the distal end M1. That is, the coating material tilt surface M2 is formed on one side of the distal end M1 of the coating material M, and the coating material tilt surface M2 is formed along the distal tube tilt surface 3b. Accordingly, the cutting tool such as the cutter is moved along the distal tube tilt surface 3b so as to cut the coating material M. In this manner, the coating material tilt surface M2 can be easily formed. Therefore, it is possible to easily form the coating material M including the distal end M1 and the coating material tilt surface M2 which can finely draw the thin line.

The coating material tilt surface M2 and the distal tube tilt surface 3b are respectively curved surfaces which linearly extend along the acute angle line A tilting to the axial direction, and which are curved outward so as to form a rounded portion of the coating material M and the distal tube 3. Therefore, since the coating material tilt surface M2 and the distal tube tilt surface 3b are the curved surfaces which are curved outward, the distal end M1 of the coating material M can have a curve shape.

The distal end M1 has the curve shape which is curved outward so as to form a rounded portion of the coating material M. The distal end M1 has a curved shape so as to bulge outward of the coating material M and the distal tube 3. Accordingly, since the distal end M1 has the curve shape which is curved outward, a thin and short line or a thin and long line can be more easily drawn by applying the distal end M1 to the coating target portion. That is, since the distal end M1 curves outward, the coating is performed along the distal end M1. In this manner, it is possible to more easily draw a hair-like thin and short line or a hair-like thin and long line.

The distal tube 3 has the opening portion 3c for holding the coating material M, and the opening portion 3c is formed so as to extend from its front end 3d to one side and the rear side in the major axis direction D1. Therefore, since the opening portion 3c extends to one side in the major axis direction D1, the inner wall surface 3h facing the coating material M can be disposed on the other side in the major axis direction D1 of the opening portion 3c.

The opening portion 3c has the inner wall surface 3h facing the coating material M, on the other side in the major axis direction D1. Therefore, when the coating is performed using the coating material M or when the coating material M is cut, even if the external force is applied to the coating material M, loss and breakage of the coating material M can be suppressed, reduced or eliminated. That is, when the external force is applied to the coating material M, the coating material M is pushed against the inner wall surface 3h, and the inner wall surface 3h holds the coating material M. In this manner, it is possible to prevent the loss and the breakage of the coating material M.

Second Group of Embodiments

Figure 13:
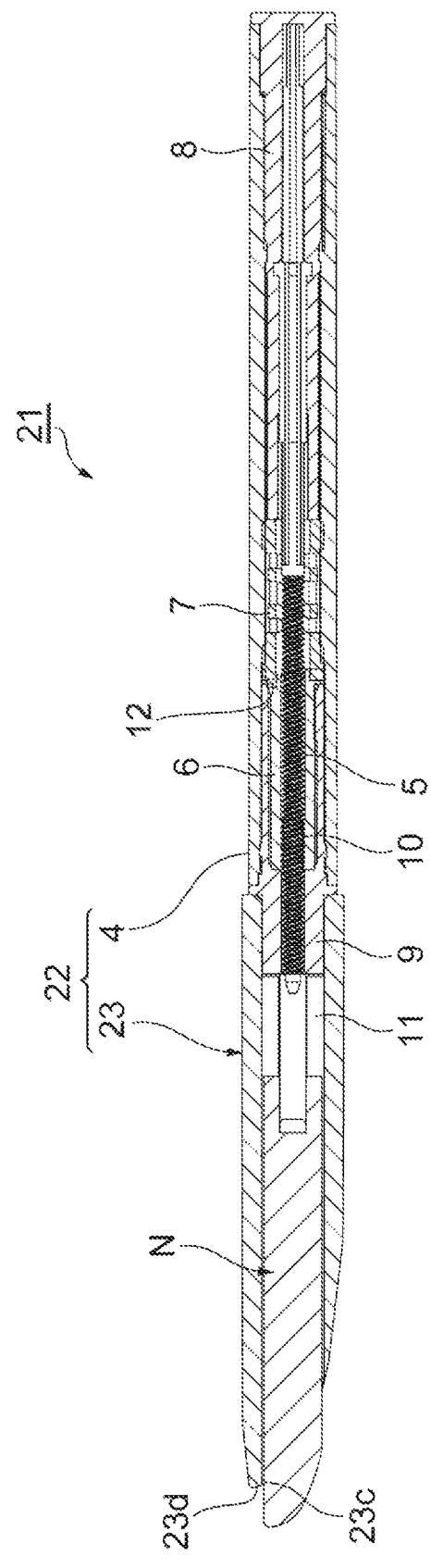
FIG. 13 is a sectional view when a coating material feeding container according to a second group of embodiments is cut along the plane including the axial direction and the major axial direction.
Figure 14:
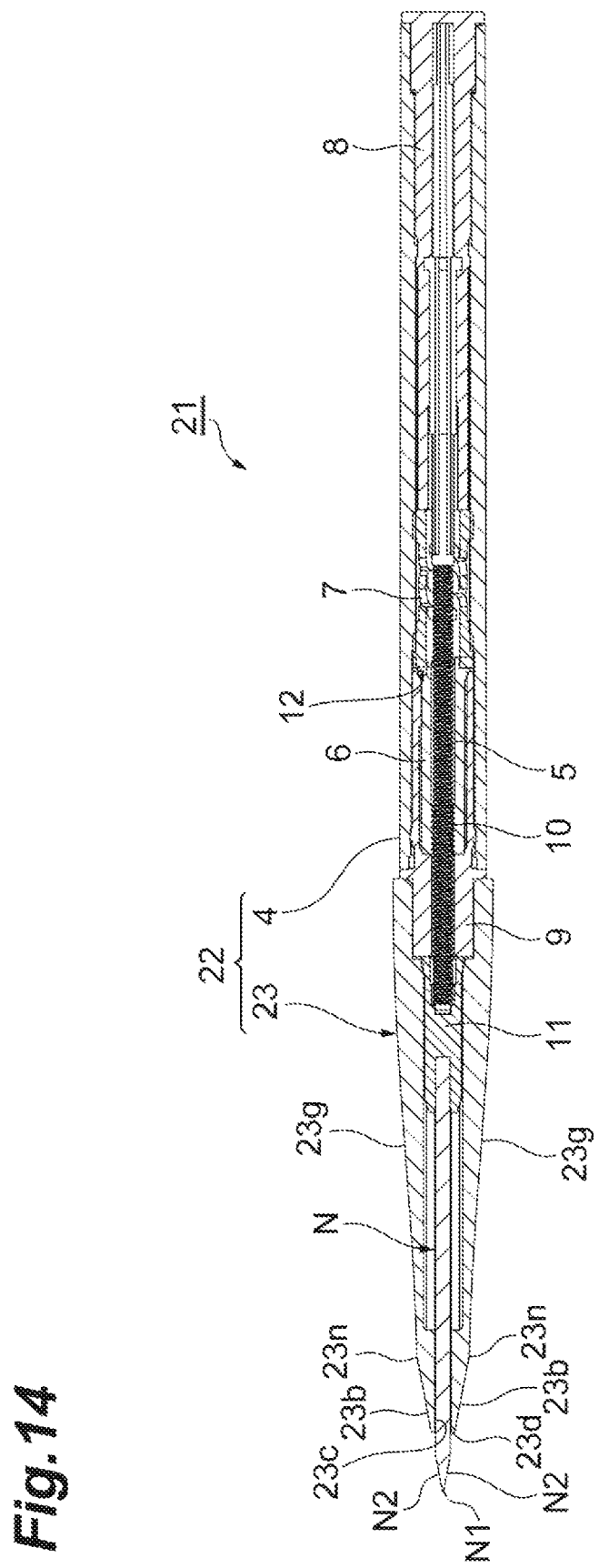
FIG. 14 is a sectional view when the coating material feeding container in FIG. 13 is cut along the plane including the axial direction and the minor axial direction.

Next, a coating material feeding container 21 will be described with reference to FIGS. 13 to 18. The configuration of a distal tube 23 and a coating material N is different from that according to the first group of embodiments. As illustrated in FIGS. 13 and 14, the coating material feeding container 21 includes the distal tube 23 configuring the container front portion, a tubular container 22 including the container main body 4 configuring the container rear portion, the mobile body 5 accommodated inside the container 22, the female screw member 6 accommodated inside the container main body 4, the spring member 7 disposed behind the female screw member 6, the tubular tail plug 8 extending in the axial direction behind the container main body 4 and inside the container main body 4, and the intermediate tube 9 located between the distal tube 23 and the container main body 4. Hereinafter, repeated description of the coating material feeding container according to the first group of embodiments will be appropriately omitted.

Figure 15:
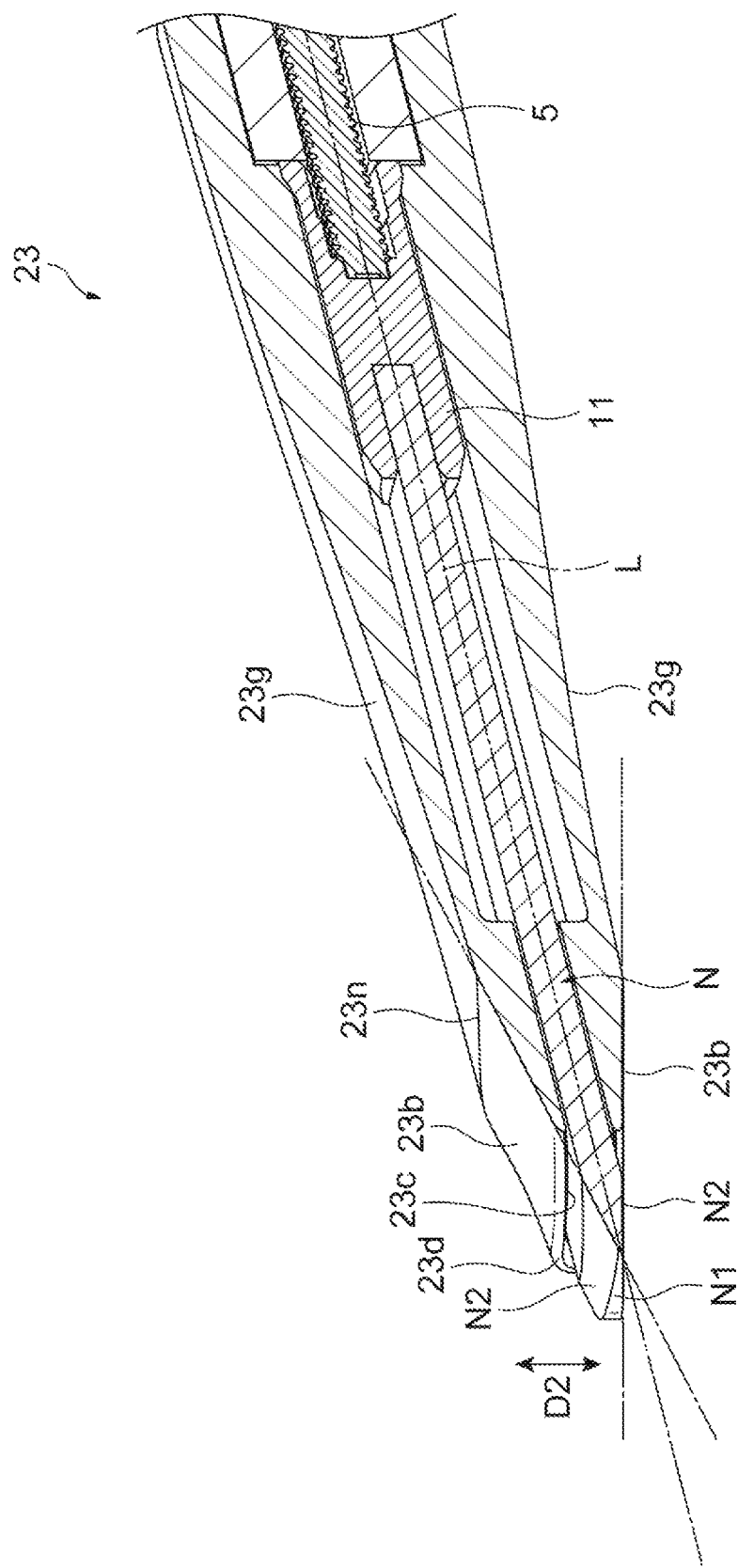
FIG. 15 is an enlarged sectional perspective view of the vicinity of the distal end of the coating material feeding container in FIG. 13.

As illustrated in FIG. 15, the outer surface of the distal tube 23 includes a distal tube tilt surface 23b extending from a front end 23d of the distal tube 23, and a rear side tilt surface 23g extending rearward from the distal tube tilt surface 23b. A boundary line 23n extends between the distal tube tilt surface 23b and the rear side tilt surface 23g. Both the distal tube tilt surface 23b and the rear side tilt surface 23g extend in a direction tilting to the axial direction. The tilt angle of the distal tube tilt surface 23b is larger than the tilt angle of the rear side tilt surface 23g.

Figure 16:
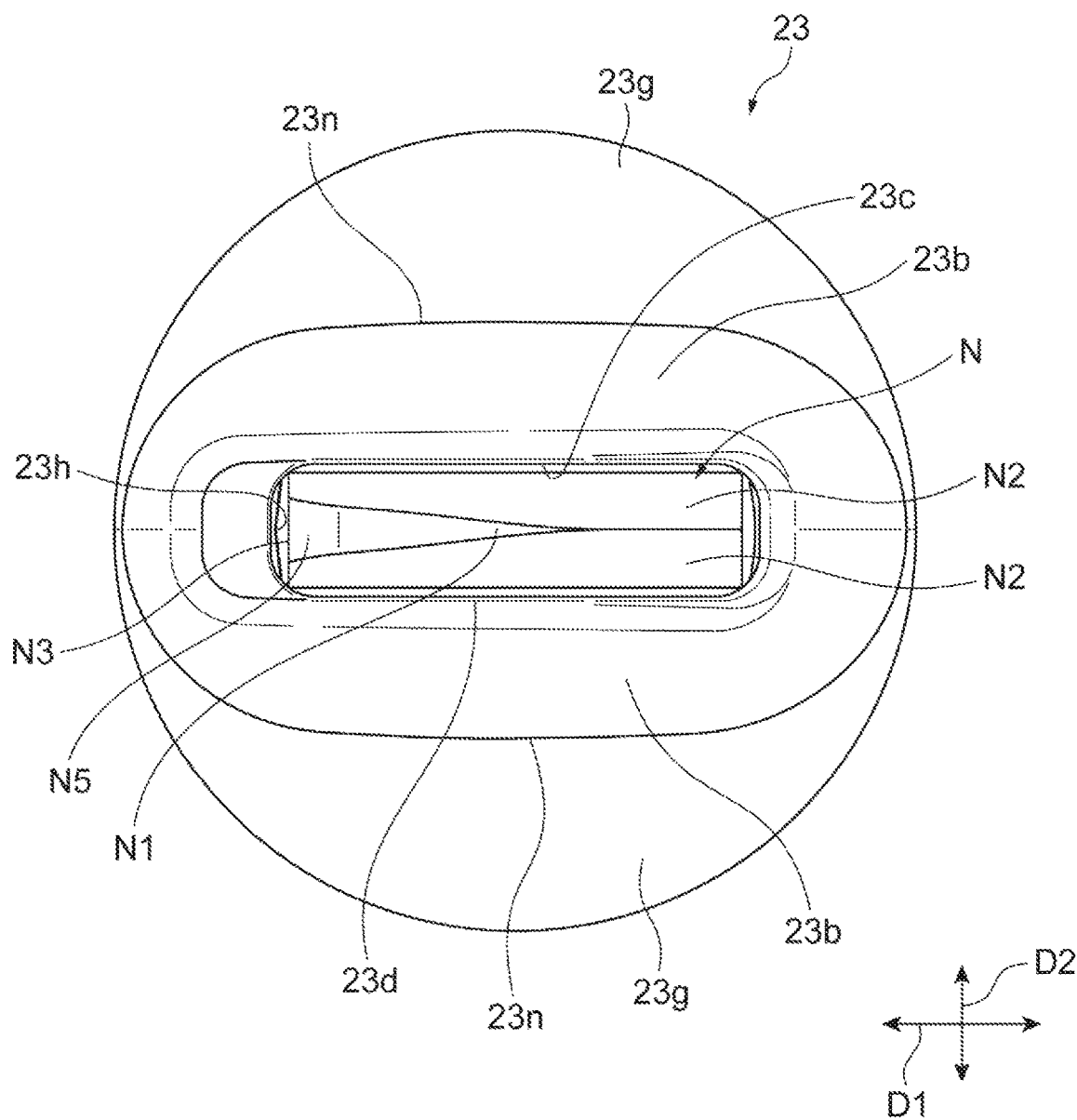
FIG. 16 is a front view illustrating the coating material and the distal tube when viewed from the front side.

As illustrated in FIGS. 15 and 16, the coating material N is fed forward from an opening portion 23c of the distal tube 23, and has a distal end N1 extending along the major axis direction D1 intersecting the axial direction. The shape of the coating material N when viewed from the front side is a shape spreading in the major axis direction D1 and the minor axis direction D2. The distal end N1 has an acute angle shape. The distal end N1 has a linear shape extending in the major axis direction D1, and the thickness of the distal end N1 is gradually narrowed from one side (left side in FIG. 16) toward the other side (right side in FIG. 16) in the major axis direction D1.

The coating material N has a coating material tilt surface N2 extending from the distal end N1 in a direction tilting to the axial direction. The coating material tilt surface N2 extends in a direction tilting to both the axial direction and the minor axial direction D2. The coating material tilt surface N2 is a surface formed along the distal tube tilt surface 23b of the distal tube 23. For example, the tilt angle of the coating material tilt surface N2 is substantially the same as the tilt angle of the distal tube tilt surface 23b.

The shape of the distal tube 23 when viewed from the front side is circular as a whole, and the front end 23d has an oval shape extending in the major axial direction D1 and the minor axial direction D2. When viewed from the front side, the distal tube tilt surface 23b has an oval shape surrounding the front end 23d and extending in the major axis direction D1 and the minor axis direction D2.

The distal tube tilt surfaces 23b are vertically disposed in a pair with respect to the front end 23d. The distal tube tilt surface 23b and the coating material tilt surface N2 are formed in a pair on both sides in the minor axis direction D2 with respect to the distal end N1. That is, the coating material tilt surface N2 is formed on both sides in the minor axis direction D2 of the distal end N1, and the distal tube tilt surfaces 23b is disposed in the pair so as to extend along the extension line of the respective coating material tilt surfaces N2. For example, the distal tube tilt surface 23b and the coating material tilt surface N2 are disposed vertically symmetrically with respect to the distal end N1.

Figure 17:
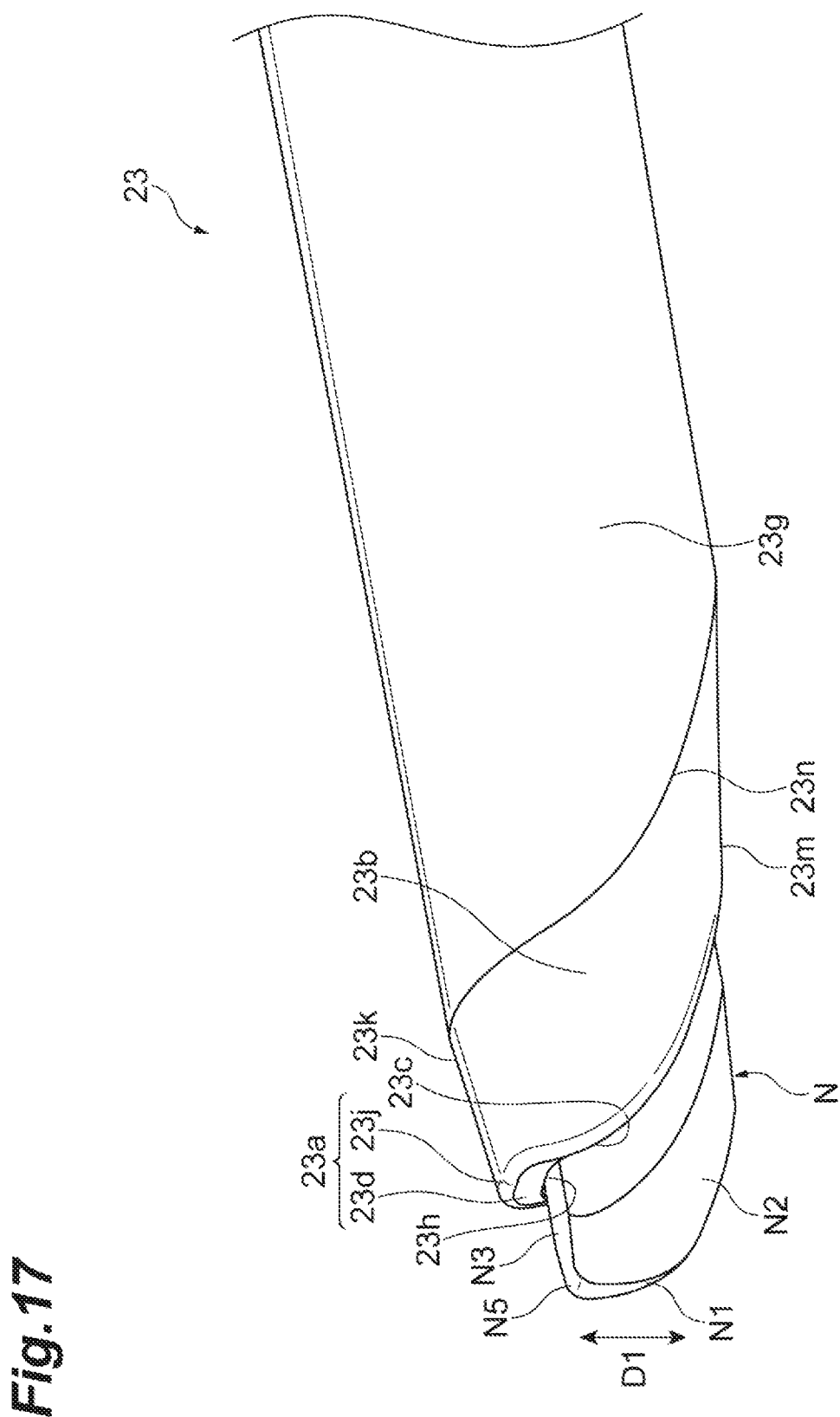
FIG. 17 is an enlarged perspective view of the vicinity of the distal end of the coating material feeding container in FIG. 13.

As illustrated in FIGS. 17 and 18, the distal tube 23 has an inner wall surface 23h facing the coating material N, inside the opening portion 23c. The inner wall surface 23h faces a first side surface N3 which is widened on one side in the major axis direction D1 of the coating material N. A curved surface N5 which is curved outward of the coating material N is formed between the first side surface N3 and the distal end N1.

A portion which is widened in the distal end N1 is contiguous with the first side surface N3 via a curved surface N5. The first side surface N3 has a flat shape, and the curved surface N5 and the distal end N1 have a curved surface shape. The distal end N1 is narrowed from one side toward the other side in the major axis direction D1, and is curved rearward.

That is, the distal end N1 is curved outward so as to form a rounded portion of the coating material N as the distal end N1 extends from one side to the other side in the major axis direction D1. A second side surface N4 which is widened rearward is disposed on the other side end portion in the main axis direction D1 of the distal end N1. In this way, the coating material N has the first side surface N3 which is widened, the curved surface N5, the linear distal end N1 which is narrowed as the distal end N1 is away from the first side surface N3, and the second side surface N4 which is widened as the second side surface N4 is away from the distal end N1. In this manner, a finer line can be drawn using the coating material N.

The coating material tilt surface N2 is curve to one side and the rear side in the major axis direction D1 from the first side surface N3 toward the second side surface N4. The coating material tilt surface N2 is curved outward so as to form a rounded portion of the coating material N from the first side surface N3 toward the second side surface N4. In other words, the coating material tilt surface N2 is curved in a curve shape from the first side surface N3 toward the second side surface N4. The width of the coating material tilt surface N2 is set to be substantially constant from the first side surface N3 to the second side surface N4.

The front end portion 23a of the distal tube 23 includes the above-described front end 23d and a curved surface 23j connecting the front end 23d and the distal tube tilt surface 23b to each other. The front end 23d is a flat surface facing the front side, and the curved surface 23j is curved from the front end 23d toward the distal tube tilt surface 23b. The distal tube tilt surface 23b is curved outward from a first side portion 23k having the inner wall surface 23h to a second side portion 23m located on the opposite side in the major axial direction D1 of the first side portion 23k. The boundary line 23n between the distal tube tilt surface 23b and the rear side tilt surface 23g is curved outward from the first side portion 23k toward the second side portion 23m.

The coating material N of the coating material feeding container 21 configured as described above can perform the cutting by applying the cutter portion C5 of the cap C to the coating material N. Specifically, the cap C is held with the hand, and the cutter portion C5 is moved along the distal tube tilt surface 23b of the distal tube 23 so as to cut the coating material N. In this manner, as illustrated in FIGS. 15 to 18, the coating material tilt surface N2 extending along the distal tube tilt surface 23b is formed.

As illustrated in FIGS. 13 and 14, when the coating material N is fed from the distal tube 23, the distal tube 23 and the container main body 4 are relatively rotated in one direction (for example, clockwise) in a state where the cap C is detached. Then, the distal tube 23, the intermediate tube 9, and the female screw member 6 are synchronously rotated, and the container main body 4, the spring member 7, the tail plug 8, and the mobile body 5 are synchronously rotated. In this manner, a screwing operation of the screw portion 10 is performed so that the mobile body 5 moves forward. As the mobile body 5 moves forward, the coating material N is caused to protrude forward from the opening portion 23c of the distal tube 23, thereby feeding the coating material N. As the coating material N is applied to the coating target portion, a portion of the coating material N coats or otherwise marks the coating target portion.

As described above, the coating material feeding container 21 includes the solid coating material N extending in the axial direction, and the distal tube 23 for holding the coating material N. As illustrated in FIGS. 15 and 16, the shape of the coating material N when viewed from the front side is the shape spreading in the major axis direction D1 and the minor axis direction D2. When viewed from the front side, the coating material N has a shape extending longer in the major axis direction D1. The distal end N1 of the coating material N has the acute angle shape, and extends in the major axis direction D1. Accordingly, the distal end N1 of the coating material N extending in the major axis direction D1 is applied to the coating target portion, and the coating material N is moved along the major axis direction D1. In this manner, the thin line can be finely drawn on the coating target portion.

In addition, the coating material tilt surface N2 is formed along the distal tube tilt surface 23b, and is formed on both sides in the minor axis direction D2 with respect to the distal end N1. Therefore, the coating material tilt surface N2 is formed on both sides of the distal end N1 of the coating material N, and the coating material tilt surface N2 is formed on the extension line of the distal tube tilt surface 23b. Accordingly, when the coating material N is cut along the distal tube tilt surface 23b, the coating material tilt surface N2 is naturally exposed on the distal end of the distal tube 23. Therefore, the coating can be performed immediately after the coating material N is cut. That is, even if the coating material N is not fed immediately after the coating material N is cut, the coating material N can be used in the coating. Therefore, the thin line can be more easily drawn.

Third Group of Embodiments

Subsequently, a coating material feeding container 31 will be described with reference to FIGS. 19A and 19B. In the coating material feeding container 31, each shape of a distal tube 33 and a coating material P is different from that according to the above-described embodiments. The outer surface of the distal tube 33 includes a distal tube tilt surface 33b extending from a front end 33d of the distal tube 33 and a rear side tilt surface 33g extending rearward from the distal tube tilt surface 33b.

The distal tube tilt surface 33b tilts to both the axial direction and the minor axis direction D2, and is curved from the front end 33d toward one side and the rear side in the major axial direction D1. The distal tube tilt surface 33b is curved outward so as to form a rounded portion of the distal tube 33. The distal tube 33 has an opening portion 33c through which the coating material P is exposed.

Similar to the distal tube tilt surface 33b, the opening portion 33c extends by being curved from the front end 33d toward one side and the rear side in the major axis direction D1. The opening portion 33c has a mountain-like protrusion 33e on the opposite side of the front end 33d. The protrusion 33e protrudes in a direction in which the width of the opening portion 33c is narrowed. Due to this protrusion 33e, the width of the opening portion 33c is the widest in both ends in the major axial direction D1, and is the narrowest at the center in the major axial direction D1. That is, the width of the opening portion 33c is gradually narrowed from one end in the major axial direction D1 to the center in the major axial direction D1. The width of the opening portion 33c is gradually widened from the center in the major axial direction D1 toward the other end in the major axial direction D1.

A shape of a coating material tilt surface P2 is a shape extending along the distal tube tilt surface 33b and the opening portion 33c. The coating material P has a distal end P1 having an acute angle shape and the coating material tilt surface P2 tilting to the direction extending along the distal tube tilt surface 33b from a distal end P1. The coating material P has a recess P3 extending along the protrusion 33e of the opening portion 33c, on one side in the minor axis direction D2. The coating material tilt surface P2 is formed by holding the cap C with the hand and moving the cutter portion C5 along the distal tube tilt surface 33b.

As described above, the coating material feeding container 31 includes the solid coating material P, and the distal tube 33 for holding the coating material P. The shape of the coating material P when viewed from the front side is a shape spreading in the major axis direction D1 and the minor axis direction D2. When viewed from the front side, the coating material P has a shape extending longer in the major axis direction D1. The distal end P1 of the coating material P has the acute angle shape, and extends in the major axis direction D1. Accordingly, the distal end P1 of the coating material P extending in the major axis direction D1 is applied to the coating target portion, and the coating material P is moved along the major axis direction D1. In this manner, the thin line can be finely drawn on the coating target portion.

Fourth Group of Embodiment

Figure 20A:
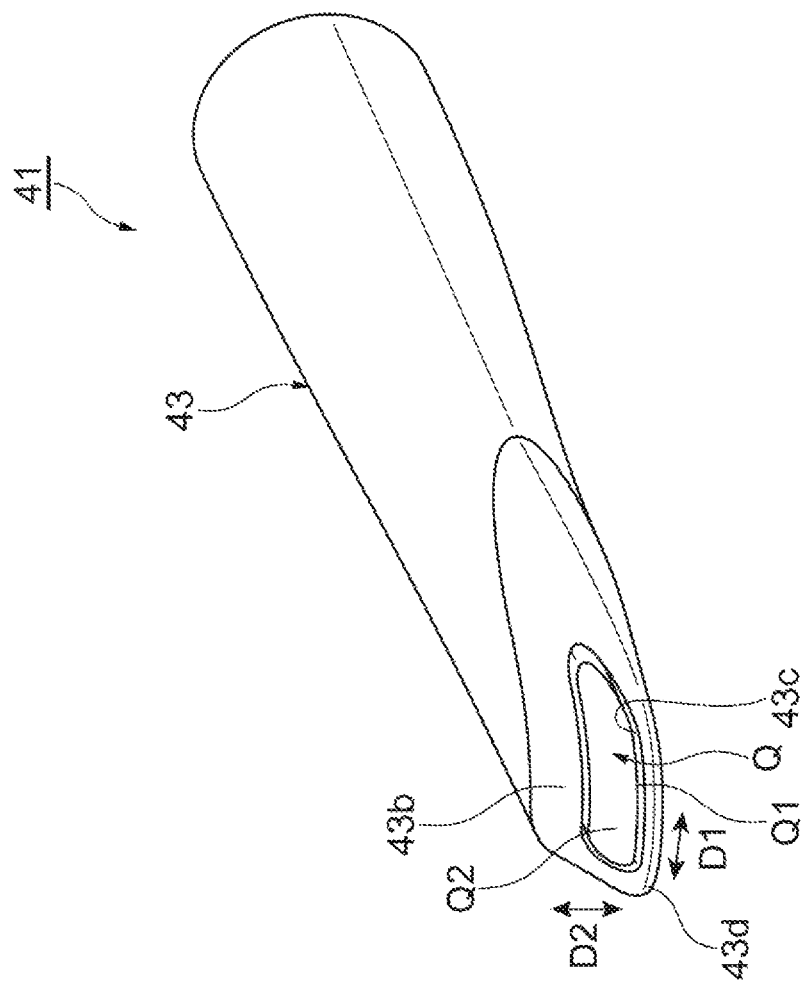
FIG. 20A is a front view illustrating a coating material and a distal tube according to a fourth group of embodiments.
Figure 20B:
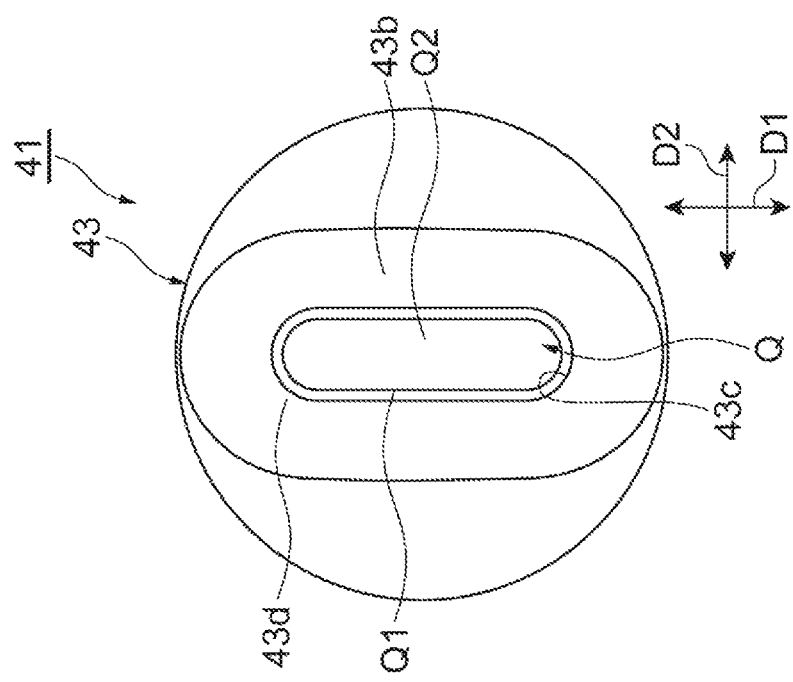
FIG. 20B is a perspective view illustrating the coating material and the distal tube in FIG. 20A.

Next, a coating material feeding container 41 will be described with reference to FIGS. 20A and 20B. The coating material feeding container 41 includes a distal tube 43 and a coating material Q which respectively have shapes different from those according to the above-described embodiments. A distal tube tilt surface 43b of the distal tube 43 tilts to both the axial direction and the minor axis direction D2.

The opening portion 43c of the distal tube 43 is curved from the front end 43d of the distal tube 43 toward one side and the rear side in the major axis direction D1. When viewed from the front side, the opening portion 43c has an oval shape (rounded rectangular shape) extending in the major axis direction D1 and the minor axis direction D2.

Both ends in the major axis direction D1 of the opening portion 43c are curved in an arc shape. The coating material Q has a distal end Q1 having an acute angle shape and a coating material tilt surface Q2 extending from the distal end Q1 along the distal tube tilt surface 43b. The shape of the coating material tilt surface Q2 is formed along the distal tube tilt surface 43b.

As described above, the coating material feeding container 41 includes the solid coating material Q and the distal tube 43 for holding the coating material Q. The shape of the coating material Q when viewed from the front side is a shape spreading in the major axis direction D1 and the minor axis direction D2. The coating material Q has the oval shape extending longer in the major axis direction D1. The distal end Q1 of the coating material Q has the acute angle shape, and extends in the major axis direction D1. Accordingly, the distal end Q1 of the coating material Q is applied to the coating target portion, and the coating material Q is moved along the major axis direction D1. In this manner, the thin line can be finely drawn on the coating target portion.

Fifth Group of Embodiment

Figure 21A:
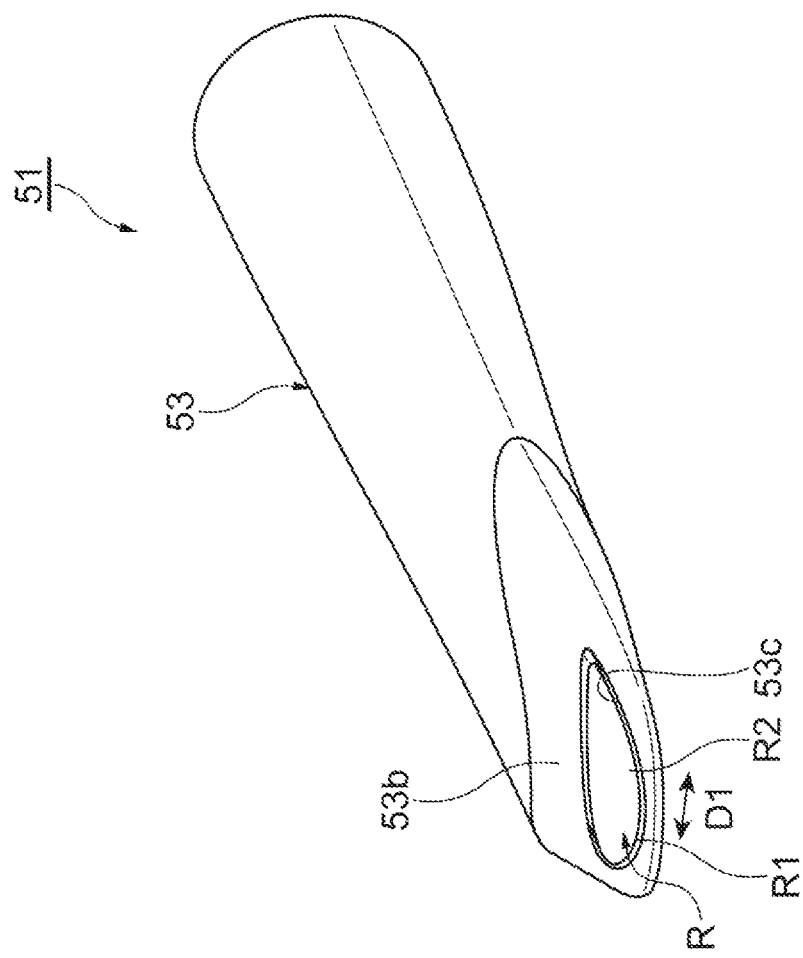
FIG. 21A is a front view illustrating a coating material and a distal tube according to a fifth group of embodiments.
Figure 21B:
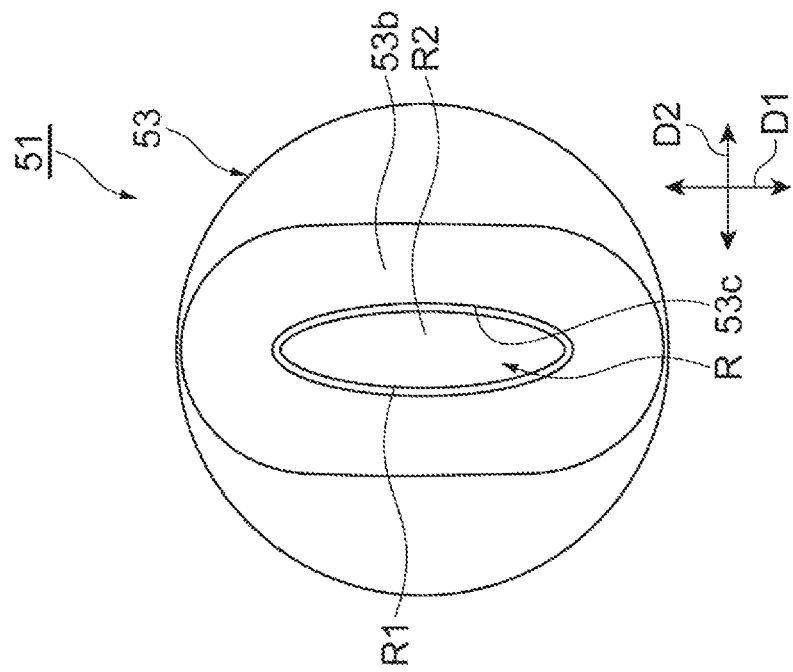
FIG. 21B is a perspective view illustrating the coating material and the distal tube in FIG. 21A.

Subsequently, a coating material feeding container 51 will be described with reference to FIGS. 21A and 21B. In the coating material feeding container 51, each shape of an opening portion 53c of a distal tube 53 having a distal tube tilt surface 53b and a coating material R having a distal end R1 and a coating material tilt surface R2 is different from that according to the fourth group of embodiments. In the fourth group of embodiments, the opening portion 43c and the coating material tilt surface Q2 have the oval shape (rounded rectangular shape). In contrast, in the fifth group of embodiments, the shape of the opening portion 53c and the coating material tilt surface R2 is an elliptical shape.

The distal end R1 of the coating material R has an acute angle shape. The distal end R1 is formed in the outer periphery on one side in the minor axis direction D2 of the coating material tilt surface R2 having the elliptical shape. That is, the distal end R1 extends longer in the major axis direction D1, and is curved so as to gently rise from the center in the major axis direction D1 toward both sides in the major axis direction D1.

As described above, the coating material feeding container 51 includes the coating material R and the distal tube 53 for holding the coating material R. The shape of the coating material R when viewed from the front side is the shape spreading in the major axis direction D1 and the minor axis direction D2. The coating material R has the elliptical shape extending longer in the major axis direction D1. The distal end R1 has the acute angle shape, and extends in the major axis direction D1. Accordingly, the distal end R1 is applied to the coating target portion, and the coating material R is moved along the major axis direction D1. In this manner, the thin line can be finely drawn on the coating target portion.

Sixth Group of Embodiments

Next, a coating material feeding container 61 will be described with reference to FIGS. 22A and 22B. An opening portion 63c of a distal tube 63 of the coating material feeding container 61 has a mountain-like protrusion 63e on the opposite side of a front end 63d. One protrusion 33e according to the third group of embodiments (FIGS. 19A and 19B) is disposed at the center in the major axis direction D1. In contrast, two protrusions 63e are disposed along the major axis direction D1.

The distal end of the protrusion 33e is sharpened. In contrast, the distal end of the protrusions 63e and a valley portion 63f between the two protrusions 63e are curved. Furthermore, a valley portion 63g located on both sides in the major axis direction D1 of the two protrusions 63e is also curved. A surface 63h on the front end 63d of the opening portion 63c extends along the major axis direction D1, and is gently curved outward of the opening portion 63c.

The coating material feeding container 61 includes a solid coating material S. The coating material S has a distal end S1 having an acute angle shape extending along the major axis direction D1, and a coating material tilt surface S2 tilting to both the axial direction and the minor axis direction D2. The distal end S1 extends along the surface 63h of the opening portion 63c on one side in the minor axis direction D2, and is gently curved outward of the coating material tilt surface S2. The coating material tilt surface S2 extends along a distal tube tilt surface 63b and the opening portion 63c of the distal tube 63.

As described above, the coating material feeding container 61 includes the distal tube 63 and the coating material S. The shape of the coating material S when viewed from the front side is the shape spreading in the major axis direction D1 and the minor axis direction D2. The coating material S has the shape extending longer in the major axis direction D1, and the distal end S1 has the acute angle shape, and extends in the major axis direction D1. Therefore, the distal end S1 is applied to the coating target portion, and the coating material S is moved along the major axis direction D1. In this manner, the thin line can be finely drawn on the coating target portion.

Seventh Group of Embodiments

Subsequently, a coating material feeding container 71 will be described with reference to FIGS. 23A and 23B. In the coating material feeding container 71, a shape of an opening portion 73c of a front end 73d of a distal tube 73 and a shape of a coating material T are different from those according to the above-described respective embodiments. The opening portion 73c has a plurality of mountain-like protrusions 73f on the front end 73d.

The plurality of protrusions 73f are arranged side by side along the major axis direction D1. For example, the number of the protrusions 73f is three. A valley portion 73g is disposed between the plurality of protrusions 73f, and a valley portion 73h is disposed on both sides in the major axis direction D1 of the plurality of protrusions 73f. In this way, a mountain-valley shape in which the mountain and the valley are arranged side by side along the major axis direction D1 is formed on the front end 73d of the opening portion 73c.

The coating material T has a distal end T1 having an acute angle shape extending along the major axis direction D1 and a coating material tilt surface T2. The distal end T1 extends along the protrusion 73f and the valley portions 73g and 73h of the distal tube 73. That is, the distal end T1 has the mountain-valley shape in which the mountain and the valley are arranged side by side along the major axis direction D1. The coating material tilt surface T2 extends along the distal tube tilt surface 73b and the opening portion 73c of the distal tube 73. The shape of the coating material T when viewed from the front side is the shape spreading in the major axis direction D1 and the minor axis direction D2. The coating material T has the form extending longer in the major axis direction D1. The distal end T1 has the acute angle shape, and extends in the major axis direction D1. Therefore, the thin line can be finely drawn on the coating target portion.

Eighth Group of Embodiment

Figures 24A, 24B:
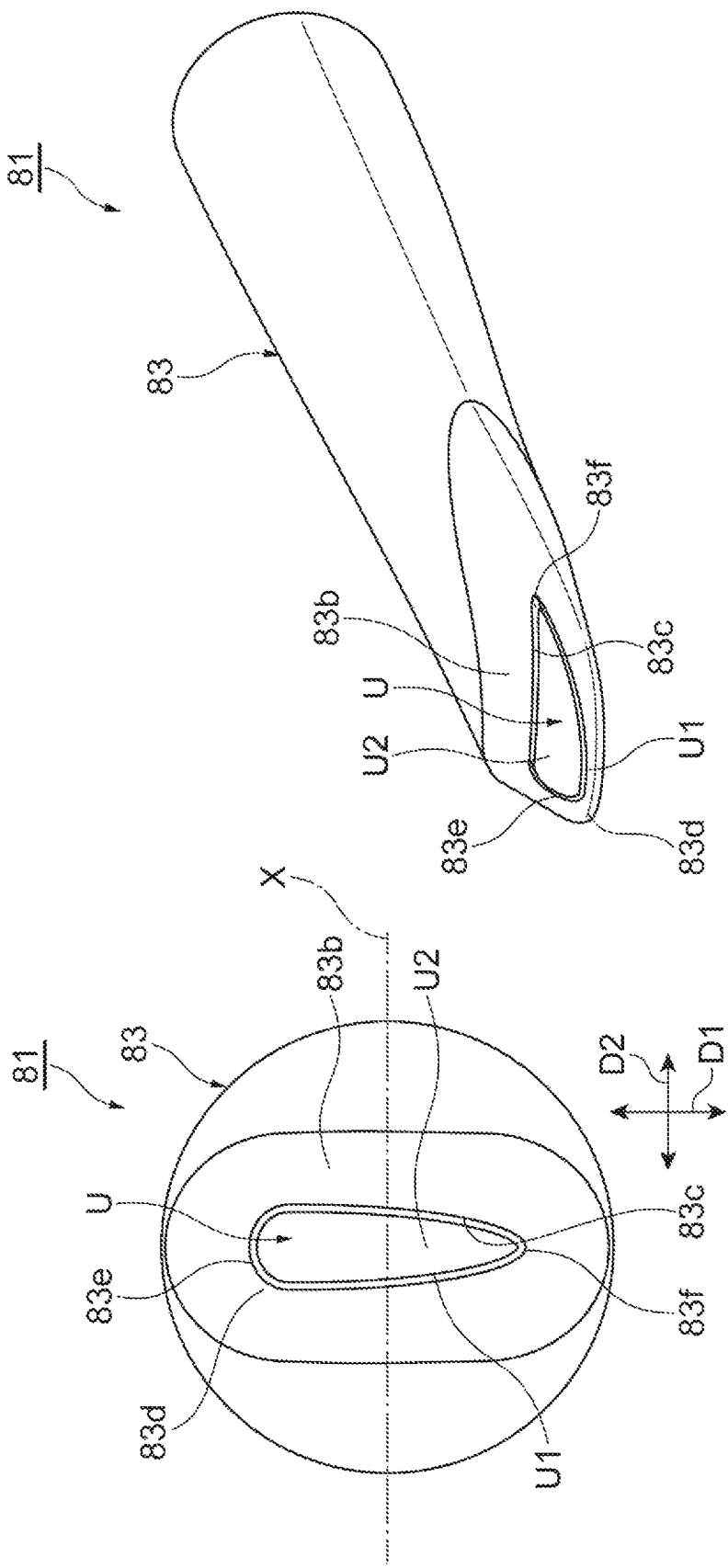
FIG. 24A is a front view illustrating a coating material and a distal tube according to an eighth group of embodiments.
FIG. 24B is a perspective view illustrating the coating material and the distal tube in FIG. 24A.

Next, a coating material feeding container 81 will be described with reference to FIGS. 24A and 24B. A shape of an opening portion 83c of a distal tube 83 of the coating material feeding container 81 and a shape of a coating material U are different from those according to the above-described respective embodiments. In the above-described respective embodiments, the shape of the opening portion and the coating material when viewed from the front side is symmetrical to the center line passing through the center in the major axis direction D1. However, according to the present group of embodiments, the shape of the opening portion 83c and the coating material U when viewed from the front side is asymmetrical to a center line X passing through the center in the major axis direction D1.

The shape of the opening portion 83c when viewed from the front side is a streamline shape extending in the major axis direction D1. One side in the major axis direction D1, that is, the opening portion 83c in a front end 83d of the distal tube 83 has a curved portion 83e which is curved in a U-shape. On the other side in the major axis direction D1, the opening portion 83c has a sharp end portion 83f which is tapered.

The coating material U has a distal end U1 having an acute angle shape, and a coating material tilt surface U2 tilting to both the axial direction and the minor axis direction D2. The distal end U1 extends along the opening portion 83c on one side in the minor axis direction D2. The coating material tilt surface U2 extends along the distal tube tilt surface 83b and the opening portion 83c of the distal tube 83. The shape of the coating material U when viewed from the front side is the shape spreading in the major axis direction D1 and the minor axis direction D2. The coating material U has a shape extending longer in the major axis direction D1. The distal end U1 has the acute angle shape, and extends in the major axis direction D1. Accordingly, the thin line can be finely drawn by applying the distal end U1 to the coating target portion.

It is to be understood that not all aspects, advantages and features described herein may necessarily be achieved by, or included in, any one particular example embodiment or group of embodiments. Indeed, having described and illustrated various examples herein, it should be apparent that other examples may be modified in arrangement and detail. For example, in the first to eighth group of embodiments, the distal tube and the coating material which have various shapes have been described. However, as long as the shape falls within the scope of the above-described examples, the shape of the distal tube and the coating material can be further changed. For example, the shape of the coating material when viewed from the front side may be a rectangular shape including a long side extending in the major axis direction and a short side extending in the minor axis direction. The coating material may have a rhombus shape or other polygonal shapes.

The coating material M having the coating material tilt surface M2 extending along the distal tube tilt surface 3b has been described. However, in an initial state before the coating material M is cut, the coating material M may not have the coating material tilt surface M2. That is, the coating material tilt surface M2 may not be formed immediately after the coating material M is manufactured or sold. The coating material tilt surface M2 may be formed by cutting the coating material M before being used. In this way, the timing at which the coating material tilt surface is formed is not particularly limited.

The coating material feeding container 1 including the container 2, the mobile body 5, the female screw member 6, the spring member 7, the tail plug 8, the intermediate tube 9, and the coating material support portion 11 has been described. However, the configuration of each portion of the coating material feeding container is not limited to the components of the above-described coating material feeding container 1, and can be appropriately modified. An example has been described in which the intermediate tube 9 is fixed to the distal tube 3. However, the intermediate tube 9 and the distal tube 3 may be molded integrally with each other.

An example has been described in which the ratchet mechanism 12 for allowing only the feeding of the coating material M by allowing the relative rotation of the distal tube 3 and the container main body 4 in only one direction is disposed between the female screw member 6 and the spring member 7. However, instead of the ratchet mechanism 12, a click mechanism for allowing the coating material M to be fed and returned may be provided. That is, the click mechanism may be provided which can prevent the coating material M from being excessively fed, by generating click sound and resistance (click feeling) in response to the relative rotation between the distal tube 3 and the container main body 4.

The coating material feeding container 1 has been described which includes the feeding mechanism including the distal tube 3, the container main body 4, the mobile body 5, the female screw member 6, the spring member 7, the tail plug 8, and the intermediate tube 9, that is, a rotary-type feeding mechanism using the screw portion 10. However, the feeding mechanism of the coating material feeding container can be appropriately modified. For example, the mechanism may be configured similar to a feeding mechanism found in a retractable ball point pen or other writing instrument.

An example has been described in which the coating material M is the eyebrow pencil and the coating material feeding container 1 is the eyebrow feeding container. However, for example, the coating material feeding container is also applicable to various stick-shaped cosmetic materials such as eye liners, concealers, or lip liners. Furthermore, the coating material feeding container is also applicable to writing instruments, design pencils, and drawing materials. Accordingly, the coating target portion may comprise an eyelid, an eyebrow, a cheek, a lip, other parts of the face, body or skin, or any combination thereof. Additionally, the coating target portion may comprise paper, canvass, ceramics or other media and objects which may be written on, drawn on, or coated. We claim all modifications and variations coming within the spirit and scope of the subject matter claimed herein.

What is claimed is:

1. A coating material feeding container comprising:
   a main body to feed a solid coating material along a longitudinal axis direction of the coating material feeding container;
   a support member to contact the solid coating material, wherein the support member is movable in the longitudinal axis direction of the main body to movably support the solid coating material; and
   a distal tube extending from the main body in the longitudinal axis direction, the distal tube having a front-end portion located opposite the main body, wherein the front-end portion includes a front end, a tilt surface and an opening to dispense the solid coating material, wherein, in a front view of the distal tube, that is orthogonal to the longitudinal axis direction, the opening has a width in a major axis direction and height in a minor axis direction, wherein the width of the opening is greater than the height of the opening, wherein the distal tube forms an accommodation space that extends in the longitudinal axis direction to accommodate the support member, wherein a width of the accommodation space in the major axis direction is narrower than the width of the opening in the major axis direction, wherein the front end is curved convexly to extend in the major axis direction from a first end to a second end of the front end, wherein the tilt surface extends rearwardly from the front end toward the main body in the minor axis direction so that the tilt surface is tilted with respect to the longitudinal axis direction and additionally tilted with respect to the minor axis direction, and wherein the opening extends away from the first end of the front end, toward the second end in the major axis direction and rearwardly toward the main body in the longitudinal axis direction.

2. The coating material feeding container according to claim 1, wherein the opening includes an inner wall surface extending in the longitudinal axis direction to face the coating material.

3. The coating material feeding container according to claim 1, wherein the tilt surface is curved convexly.

4. The coating material feeding container according to claim 1, wherein the front end separates a first side of the front-end portion from a second side opposite the first side in the minor axis direction, wherein the tilt surface of the distal tube is a first tilt surface located on the first side, and wherein the distal tube includes a second tilt surface located on the second side of the front-end portion.

5. The coating material feeding container according to claim 1, wherein the accommodation space includes a first portion having a first width that is equal to the width of the opening to accommodate the support member and the solid coating material, and a second portion that extends from the first portion in the minor axis direction to accommodate the support member, and wherein the second portion has a second width that is narrower than the first width and that corresponds to the width of the accommodation space that is narrower than the width of the opening.

6. The coating material feeding container according to claim 1, wherein the support member is sized to slide longitudinally in the accommodation space of the distal tube so that a width of the support member in the major axis direction is less than the width of the opening in the major axis direction.

7. The coating material feeding container according to claim 6, wherein the width of the support member in the major axis direction is substantially equal to the width of the accommodation space in the major axis direction.

* * * * *